(12) United States Patent
Jones

(10) Patent No.: US 8,577,894 B2
(45) Date of Patent: Nov. 5, 2013

(54) METHOD AND SYSTEM FOR ACCESS TO RESTRICTED RESOURCES

(75) Inventor: Scott A. Jones, Carmel, IN (US)

(73) Assignee: ChaCha Search, Inc, Carmel, IN (US)

( * ) Notice: Subject to any disclaimer, the term of this patent is extended or adjusted under 35 U.S.C. 154(b) by 786 days.

(21) Appl. No.: 12/359,622

(22) Filed: Jan. 26, 2009

(65) Prior Publication Data

US 2009/0193016 A1    Jul. 30, 2009

Related U.S. Application Data

(60) Provisional application No. 61/023,635, filed on Jan. 25, 2008.

(51) Int. Cl.
*G06F 17/30* (2006.01)
(52) U.S. Cl.
USPC .......................................... 707/748; 707/783
(58) Field of Classification Search
USPC ................................................. 707/748, 783
See application file for complete search history.

(56) References Cited

U.S. PATENT DOCUMENTS

| | | | |
|---|---|---|---|
| 5,099,426 A * | 3/1992 | Carlgren et al. | ................... 704/9 |
| 5,559,940 A | 9/1996 | Hutson | |
| 5,678,041 A * | 10/1997 | Baker et al. | ........................... 1/1 |
| 5,732,259 A | 3/1998 | Konno | |
| 5,772,446 A | 6/1998 | Rosen | |
| 5,862,223 A | 1/1999 | Walker | |
| 5,867,799 A | 2/1999 | Lang | |
| 5,875,231 A | 2/1999 | Farfan | |
| 5,915,010 A | 6/1999 | McCalmont | |
| 5,918,010 A | 6/1999 | Appleman | |
| 5,930,788 A | 7/1999 | Wical | |
| 5,937,422 A | 8/1999 | Nelson | |
| 5,948,054 A | 9/1999 | Nielsen | |
| 5,983,221 A | 11/1999 | Christy | |
| 5,987,457 A | 11/1999 | Ballard | |
| 6,023,586 A | 2/2000 | Gaisford | |
| 6,026,148 A | 2/2000 | Dworkin | |
| 6,026,403 A * | 2/2000 | Siefert | ................................. 1/1 |
| 6,081,788 A | 6/2000 | Appleman | |

(Continued)

FOREIGN PATENT DOCUMENTS

| | | |
|---|---|---|
| EP | 1193625 | 4/2002 |
| EP | 1341099 | 9/2003 |

(Continued)

OTHER PUBLICATIONS

International Search Report issued on Mar. 4, 2009 in corresponding International Patent Application PCT/US 09/31998.

(Continued)

*Primary Examiner* — Jorge A Casanova
(74) *Attorney, Agent, or Firm* — Staas & Halsey

(57) ABSTRACT

A method and system of providing a search result to a user based on information indicated in a restricted access resource is described. A search system utilizing the assistance of human searchers or guides may obtain a search result using information included in a restricted resource. Access to a restricted resource is granted to guides based on access information provided to the search service. A guide may access information indicated in a restricted resource in order to obtain a search result. A search result obtained based on information indicated in a restricted resource may be returned to a user.

19 Claims, 11 Drawing Sheets

(56) References Cited

U.S. PATENT DOCUMENTS

| | | |
|---|---|---|
| 6,101,515 A | 8/2000 | Wical |
| 6,115,709 A | 9/2000 | Gilmour |
| 6,157,926 A | 12/2000 | Appleman |
| 6,178,416 B1 | 1/2001 | Thompson |
| 6,195,681 B1 | 2/2001 | Appleman |
| 6,198,904 B1 | 3/2001 | Rosen |
| 6,205,472 B1 | 3/2001 | Gilmour |
| 6,212,545 B1 | 4/2001 | Ohtani |
| 6,223,165 B1 | 4/2001 | Lauffer |
| 6,226,648 B1 | 5/2001 | Appleman |
| 6,253,202 B1 | 6/2001 | Gilmour |
| 6,308,175 B1 | 10/2001 | Lang |
| 6,314,420 B1 | 11/2001 | Lang |
| 6,327,590 B1 | 12/2001 | Chidlovskii |
| 6,332,141 B2 | 12/2001 | Gonzalez |
| 6,336,132 B2 | 1/2002 | Appleman |
| 6,347,943 B1 | 2/2002 | Fields |
| 6,377,949 B1 | 4/2002 | Gilmour |
| 6,405,197 B2 | 6/2002 | Gilmour |
| 6,421,669 B1 | 7/2002 | Gilmour |
| 6,421,675 B1 | 7/2002 | Ryan |
| 6,430,558 B1 | 8/2002 | Delano |
| 6,434,549 B1 | 8/2002 | Linetsky |
| 6,493,711 B1 | 12/2002 | Jeffrey |
| 6,507,841 B2 | 1/2003 | Riverieulx de Varax |
| 6,516,312 B1 | 2/2003 | Kraft |
| 6,523,010 B2 | 2/2003 | Lauffer |
| 6,546,388 B1 | 4/2003 | Edlund |
| 6,571,239 B1 | 5/2003 | Cole |
| 6,578,010 B1 | 6/2003 | Teacherson |
| 6,578,022 B1 | 6/2003 | Foulger |
| 6,598,043 B1 | 7/2003 | Baclawski |
| 6,601,061 B1 | 7/2003 | Holt |
| 6,633,867 B1 | 10/2003 | Kraft |
| 6,640,229 B1 | 10/2003 | Gilmour |
| 6,647,383 B1 | 11/2003 | August |
| 6,647,384 B2 | 11/2003 | Gilmour |
| 6,675,159 B1 | 1/2004 | Lin |
| 6,691,159 B1 | 2/2004 | Grewal |
| 6,708,165 B2 | 3/2004 | Jeffrey |
| 6,732,088 B1 | 5/2004 | Glance |
| 6,745,178 B1 | 6/2004 | Emens |
| 6,766,320 B1 | 7/2004 | Wang |
| 6,772,148 B2 | 8/2004 | Baclawski |
| 6,775,664 B2 | 8/2004 | Lang |
| 6,799,174 B2 | 9/2004 | Chipman et al. |
| 6,829,585 B1 | 12/2004 | Grewal |
| 6,845,369 B1 | 1/2005 | Rodenburg |
| 6,847,972 B1 | 1/2005 | Vernau |
| 6,873,982 B1 | 3/2005 | Bates |
| 6,877,034 B1 | 4/2005 | Machin |
| 6,895,406 B2 | 5/2005 | Fables |
| 6,901,394 B2 | 5/2005 | Chauhan |
| 6,941,372 B2 | 9/2005 | Pearson |
| 6,947,924 B2 | 9/2005 | Bates . |
| 6,952,678 B2 | 10/2005 | Williams |
| 6,970,879 B1 | 11/2005 | Gilmour |
| 6,978,264 B2 | 12/2005 | Chandrasekar |
| 7,010,568 B1 | 3/2006 | Schneider |
| 7,016,889 B2 | 3/2006 | Bazoon |
| 7,020,679 B2 | 3/2006 | Tian |
| 7,032,115 B2 | 4/2006 | Kashani |
| 7,047,229 B2 | 5/2006 | Goel |
| 7,072,888 B1 | 7/2006 | Perkins |
| 7,076,497 B2 | 7/2006 | Donteverde |
| 7,085,771 B2 | 8/2006 | Chung |
| 7,181,513 B1* | 2/2007 | Harada et al. ............ 709/223 |
| 7,203,725 B1 | 4/2007 | Gilmour |
| 7,333,980 B2 | 2/2008 | Bjornson et al. |
| 7,340,446 B2 | 3/2008 | Rajarajan |
| 7,360,234 B2* | 4/2008 | Robson et al. ............ 725/127 |
| 2001/0009013 A1 | 7/2001 | Appleman |
| 2001/0047290 A1 | 11/2001 | Petras |
| 2002/0059221 A1* | 5/2002 | Whitehead et al. ........... 707/5 |
| 2002/0059313 A1* | 5/2002 | Yoon et al. ............... 707/200 |
| 2002/0059395 A1 | 5/2002 | Liou |
| 2002/0062343 A1 | 5/2002 | Appleman |
| 2002/0087520 A1 | 7/2002 | Meyers |
| 2002/0120609 A1 | 8/2002 | Lang |
| 2002/0120619 A1 | 8/2002 | Marso |
| 2002/0140715 A1 | 10/2002 | Smet |
| 2002/0147848 A1 | 10/2002 | Burgin |
| 2002/0164004 A1 | 11/2002 | Tamura |
| 2002/0167539 A1 | 11/2002 | Brown |
| 2002/0198962 A1 | 12/2002 | Horn |
| 2003/0014403 A1 | 1/2003 | Chandrasekar |
| 2003/0018621 A1 | 1/2003 | Steiner |
| 2003/0046098 A1 | 3/2003 | Kim |
| 2003/0065774 A1 | 4/2003 | Steiner |
| 2003/0069878 A1 | 4/2003 | Wise |
| 2003/0084040 A1 | 5/2003 | Jeffrey |
| 2003/0120653 A1 | 6/2003 | Brady |
| 2003/0131000 A1 | 7/2003 | Bates |
| 2003/0140037 A1 | 7/2003 | Deh-Lee |
| 2003/0142797 A1 | 7/2003 | Troy |
| 2003/0144895 A1 | 7/2003 | Aksu |
| 2003/0145001 A1 | 7/2003 | Craig |
| 2003/0163454 A1 | 8/2003 | Jacobsen |
| 2003/0174818 A1 | 9/2003 | Hazenfield |
| 2003/0198325 A1 | 10/2003 | Bayne |
| 2003/0204501 A1 | 10/2003 | Moon |
| 2003/0208535 A1 | 11/2003 | Appleman |
| 2003/0217335 A1 | 11/2003 | Chung |
| 2003/0220919 A1 | 11/2003 | Tsitas |
| 2004/0010484 A1 | 1/2004 | Foulger |
| 2004/0023644 A1 | 2/2004 | Montemer |
| 2004/0024752 A1 | 2/2004 | Manber |
| 2004/0049541 A1 | 3/2004 | Swahn |
| 2004/0093325 A1 | 5/2004 | Banerjee |
| 2004/0107118 A1 | 6/2004 | Harnsberger |
| 2004/0133469 A1 | 7/2004 | Chang |
| 2004/0162820 A1 | 8/2004 | James |
| 2004/0167931 A1 | 8/2004 | Han |
| 2004/0177088 A1 | 9/2004 | Jeffrey |
| 2004/0193606 A1* | 9/2004 | Arai et al. ................. 707/9 |
| 2004/0203634 A1 | 10/2004 | Wang |
| 2004/0205065 A1 | 10/2004 | Petras |
| 2004/0210550 A1 | 10/2004 | Williams |
| 2004/0210661 A1 | 10/2004 | Thompson |
| 2004/0230572 A1 | 11/2004 | Omoigui |
| 2004/0243466 A1 | 12/2004 | Trzybinski |
| 2004/0254920 A1 | 12/2004 | Brill |
| 2005/0021539 A1* | 1/2005 | Short et al. ............... 707/100 |
| 2005/0033761 A1 | 2/2005 | Guttman |
| 2005/0060217 A1 | 3/2005 | Douglas |
| 2005/0080776 A1 | 4/2005 | Colledge |
| 2005/0086290 A1 | 4/2005 | Joyce |
| 2005/0091211 A1 | 4/2005 | Vernau |
| 2005/0105712 A1 | 5/2005 | Williams |
| 2005/0114299 A1 | 5/2005 | Bharat |
| 2005/0120003 A1 | 6/2005 | Drury |
| 2005/0131866 A1 | 6/2005 | Badros |
| 2005/0136949 A1 | 6/2005 | Barnes |
| 2005/0138193 A1 | 6/2005 | Encarnacion |
| 2005/0160065 A1 | 7/2005 | Seeman |
| 2005/0160107 A1 | 7/2005 | Liang |
| 2005/0165742 A1 | 7/2005 | Chin |
| 2005/0165766 A1 | 7/2005 | Szabo |
| 2005/0165777 A1 | 7/2005 | Hurst-Hiller |
| 2005/0165780 A1 | 7/2005 | Omega |
| 2005/0187895 A1 | 8/2005 | Paya |
| 2005/0198021 A1 | 9/2005 | Wilcox |
| 2005/0198116 A1 | 9/2005 | Appleman |
| 2005/0203800 A1 | 9/2005 | Sweeney |
| 2005/0210042 A1 | 9/2005 | Goedken |
| 2005/0222975 A1 | 10/2005 | Nayak |
| 2005/0246358 A1 | 11/2005 | Gross |
| 2005/0256848 A1 | 11/2005 | Alpert |
| 2005/0278317 A1 | 12/2005 | Gross |
| 2005/0289124 A1 | 12/2005 | Kaiser |
| 2005/0289168 A1 | 12/2005 | Green |
| 2006/0004713 A1 | 1/2006 | Korte |
| 2006/0010105 A1 | 1/2006 | Sarukkai |
| 2006/0015488 A1 | 1/2006 | Perisic |

(56) References Cited

U.S. PATENT DOCUMENTS

| | | |
|---|---|---|
| 2006/0015498 A1 | 1/2006 | Sarmiento |
| 2006/0020587 A1 | 1/2006 | Kausik |
| 2006/0020593 A1 | 1/2006 | Ramsaier |
| 2006/0026147 A1 | 2/2006 | Cone |
| 2006/0026152 A1 | 2/2006 | Zeng |
| 2006/0037022 A1 | 2/2006 | Byrd |
| 2006/0041550 A1 | 2/2006 | Bennett |
| 2006/0041562 A1 | 2/2006 | Paczkowski |
| 2006/0053097 A1 | 3/2006 | King et al. |
| 2006/0064411 A1 | 3/2006 | Gross |
| 2006/0069674 A1 | 3/2006 | Palmon |
| 2006/0070012 A1 | 3/2006 | Milener |
| 2006/0074863 A1 | 4/2006 | Kishore |
| 2006/0074891 A1 | 4/2006 | Chandrasekar |
| 2006/0074984 A1 | 4/2006 | Milener |
| 2006/0080316 A1* | 4/2006 | Gilmore et al. .......... 707/9 |
| 2006/0095345 A1 | 5/2006 | Ka |
| 2006/0100956 A1 | 5/2006 | Ryan |
| 2006/0122979 A1 | 6/2006 | Kapur |
| 2006/0122991 A1 | 6/2006 | Chandrasekar |
| 2006/0129541 A1 | 6/2006 | Morgan |
| 2006/0129636 A1 | 6/2006 | Matsuura |
| 2006/0155694 A1 | 7/2006 | Chowdhury |
| 2006/0195442 A1 | 8/2006 | Cone |
| 2006/0265361 A1 | 11/2006 | Chu |
| 2006/0287916 A1 | 12/2006 | Starr |
| 2006/0288087 A1 | 12/2006 | Sun |
| 2006/0294085 A1 | 12/2006 | Rose |
| 2007/0005344 A1 | 1/2007 | Sandor |
| 2007/0005698 A1 | 1/2007 | Kumar |
| 2007/0014537 A1 | 1/2007 | Weseman |
| 2007/0016563 A1 | 1/2007 | Omoigui |
| 2007/0027859 A1 | 2/2007 | Harney |
| 2007/0043712 A1 | 2/2007 | Ramberg |
| 2007/0050245 A1 | 3/2007 | Humphries, IV |
| 2007/0050388 A1 | 3/2007 | Martin |
| 2007/0073894 A1 | 3/2007 | Erickson |
| 2007/0078803 A1 | 4/2007 | Gilmour et al. |
| 2007/0081197 A1 | 4/2007 | Omoigui |
| 2007/0100798 A1 | 5/2007 | Kapur |
| 2007/0112761 A1 | 5/2007 | Xu |
| 2007/0136256 A1 | 6/2007 | Kapur |
| 2007/0198340 A1 | 8/2007 | Lucovsky |
| 2007/0208688 A1 | 9/2007 | Bandhole |
| 2007/0244872 A1 | 10/2007 | Hancock |
| 2007/0250501 A1 | 10/2007 | Grubb et al. |
| 2007/0255702 A1 | 11/2007 | Orme |
| 2007/0271234 A1 | 11/2007 | Ravikiran |
| 2008/0005086 A1 | 1/2008 | Moore |
| 2008/0005101 A1 | 1/2008 | Chandra |
| 2008/0172366 A1* | 7/2008 | Hannel et al. .......... 707/3 |
| 2009/0063452 A1* | 3/2009 | Ahn et al. .......... 707/5 |

FOREIGN PATENT DOCUMENTS

| | | |
|---|---|---|
| JP | 2001 202390 | 12/2001 |
| JP | 2001 357068 | 12/2001 |
| WO | 01/01277 | 1/2001 |
| WO | 03/056467 | 7/2003 |
| WO | 2004/111873 | 12/2004 |
| WO | 2005/048078 | 5/2005 |
| WO | 2007/052285 | 5/2007 |

OTHER PUBLICATIONS

Carmel, et al., "Searching XML Documents via XML Fragments," 2003, ACM, pp. 151-158.
Karat, et al., "Patterns of Entry and Correction in Large Vocabulary Continuous Speech Recognition Systems," 1999, ACM, pp. 568-575.
Google Tutor, "Googling from your Mobile Phone—no Web Browser Needed!," 2005, Google Tutor.
Varshney, et al., "Voice Over IP," 2002, Communications of the ACM, vol. 45, No. 1, pp. 89-96.
Knoblock, Craig A., "Searching the World Wide Web," 1997, IEEE Expert, pp. 8-14.
Sullivan, Danny, "Google Launches Personalized Home Page," Search Engine Watch, May 2005.
Koffey, Nicole, webhelp.com Answers Questions With a Personal Touch, Nov. 30, 1999.
"GoodLawyer: Help with Legal Questions (California)".
Patent Abstract of Taiwanese Patent Publication No. 548558B.
International Search Report mailed on Mar. 4, 2009, in PCT/US09/31998 (U.S. Appl. No. 12/359,622).

* cited by examiner

400

USER RECORD

| | Description | Example Content |
|---|---|---|
| 405 | User record ID | '502.331.2204 - 4772' |
| 410 | User channel identifier list | '502.331.2204';'usertom@chacha.com' |
| 415 | User request list | 'are there mountain gorillas in zimbabwe'; 'usertom@chacha.com,12.48.08, 13 October 2006' |
| 420 | User result list | 'www.awebsite.com';'there are 50 mountain gorillas in zimbabwe'; 'www.dictionary.com'; |

GUIDE RECORD

| | Description | Example Content |
|---|---|---|
| 505 | Guide record ID | 'bob smith' |
| 510 | Guide channel identifier list | '317.244.2444';'guidebob@chacha.com' |
| 515 | Guide request list | 'are there mountain gorillas in zimbabwe'; '502.455.3301,12.48.08, 13 October 2006' |
| 520 | Guide result list | 'there are 50 mountain gorillas in zimbabwe'; 'a stone is equal to 14 pounds' |
| 525 | Guide keyword/category list | 'stone_science>physics>measurement'; 'zimbabwe_geography>africa' |

FIG. 5

RESTRICTED RESOURCE RECORD
600

| | Description | Example Content |
|---|---|---|
| 605 | Restricted Resource record ID | 'national geographic' |
| 610 | Restricted Resource channel identifier | 'https://nationalgeographic.com'; 'questions@nationalgeographic.com' |
| 615 | Restricted Resource access information | username='chachaguides';password='getbetteranswers1'; username='chachasms';password='getbetteranswers2'; username='mountain';password='getbetteranswers3' |
| 620 | Restricted Resource guide list | 'bob smith','tom thomas'; 'chachatext' |
| 625 | Restricted Resource user list | 'rob roberts','414.311.3344'; 'anyuser' |
| 630 | Restricted Resource request list | 'are there mountain gorillas in zimbabwe'; '414.311.3344, 13.15.08, 14 October 2006' |
| 635 | Restricted Resource result list | 'there are 50 mountain gorillas in zimbabwe'; 'there are four hundred mountain gorillas in captivity'; 'there are 27 known species of ferns in indiana' |
| 640 | Restricted Resource keyword/category | 'mountain gorillas_science>biology>primates' |

FIG. 6

REQUEST RECORD 700

| Description | Example Content |
|---|---|
| 705 Request record ID | 'are there mountain gorillas in zimbabwe' |
| 710 User ID | '502.331.2204 - 4772'; 'ralph rogers' |
| 715 Guide ID | 'curious george'; 'bob smith'; '502.330.1454' |
| 720 Result ID | 'www.awebsite.com'; 'there are 50 mountain gorillas in zimbabwe' |
| 725 Keyword and category ID | 'mountain gorillas_science>biology>primates'; 'zimbabwe_geography>africa' |

FIG. 7

RESULT RECORD 800

| | Description | Example Content |
|---|---|---|
| 805 | Result record ID | 'there are 50 mountain gorillas in zimbabwe' |
| 810 | Result guide ID | 'bob smith' |
| 815 | Result resource ID | 'national geographic' |
| 820 | Result keyword/category ID | 'mountain gorillas_science>biology>primates' |
| 825 | Result usage info | '1005' |

FIG. 8

KEYWORD/CATEGORY RECORD 900

| | Description | Example Content |
|---|---|---|
| 905 | Keyword/category record ID | 'mountain gorillas science>biology>primates' |
| 910 | Keyword/category guide ID | '502.330.1454';'mark marx' |
| 915 | Keyword/category guide rating | '9.0';'7.5' |
| 920 | Keyword/category resource ID | 'national geographic';'gorilla wiki' |
| 925 | Keyword/category resource rating | '9.5';'5.5' |

FIG. 9

770
Request Record Table

| Request Record ID | User ID | Guide ID | Result ID |
|---|---|---|---|
| Request 1 | User 1 | Guide 1; Guide 2 | Result111;Result112; Result121 |
| Request 2 | User 1; User 2 | Guide 1; Guide 3 | Result211;Result212; Result231 |
| Request 3 | User 1; User 3 | Guide 1; Guide 2 | Result311;Result312; Result321;Result322 |
| Request 4 | User 3 | Guide 2; Guide 3 | Result421;Result422;Result423; Result431 |

⋮   ⋮

660
Restricted Resource Record Table

| Restricted resource ID | Restricted resource guide ID | Restricted resource user ID | Restricted resource request ID | Restricted resource result ID |
|---|---|---|---|---|
| PDB 1 | Guide 1; Guide 2 | User 1 | Request 1; Request 2 | Result112; Result212 |
| PDB 2 | Guide 2; Guide 3 | Any | Request 2; Request 4 | Result231; Result421;Result423;Result431 |
| PDB 3 | Any | User 3 | Request 3; Request 4 | Result311;Result321 |
| PDB 4 | Any | Any | Request 1; Request 2; Request 4 | Result111; Result211; Result431 |

METHOD AND SYSTEM FOR ACCESS TO RESTRICTED RESOURCES

CROSS-REFERENCE TO RELATED APPLICATIONS

This application is related to and claims the benefit of priority to U.S. Provisional Application Ser. No. 61/023,635 entitled "METHOD AND SYSTEM FOR ACCESS TO PRIVATE RESOURCES", by Scott A. Jones, filed Jan. 25, 2008 in the United States Patent and Trademark Office, the disclosure of which is incorporated herein in its entirety by reference.

BACKGROUND

1. Field

The invention relates to search engine technology and specifically to search engines which utilize human searchers or guides. A method and system is disclosed whereby access to a private or restricted database is provided to user(s) of a human-assisted search system in order to facilitate more effective use of the restricted resource.

2. Description of the Related Art

In current search systems, it is generally difficult for a user to access information which is contained in a restricted resource, such as an on-line magazine or newspaper, or a research company report, or other types of private information. Resources such as ABI Research, Hoovers™, Dun and Bradstreet, scientific journals such as *Science,* or *Nature,* etc. which may contain information which would be valuable to non-subscribers are generally not accessible. If non-subscribers are made aware of such information, a service provider might increase its subscription base. However, such resources are not well indexed by current search engine technologies.

One solution which is currently practiced is that a restricted resource, such as a subscription service, may provide a limited set of information which may be accessible to a web crawler or other search system. Such information may be used to provide an excerpt or abstract from content of the resource, which may be presented to persons who are not authorized to access the full information contained in the resource. However, this information is typically limited and only includes a few lines of text and/or a header of some of the files available from the restricted resource. In such a case, other data which is available from public resources may be more likely to be presented to users of a typical search engine. In addition, creating a set of information which may be published for web crawling may require significant effort for the operators of the restricted resource system. The difficulties associated with crawling private and proprietary web resources are well described in 'The Invisible Web: Uncovering Sources Search Engines Can't See' by Chris Sherman, and Gary Price Library Trends 52(2) 2003: Organizing the Internet: 282-298.

In light of this and other problem(s) associated with existing technologies, a method and system whereby a human guide can provide a search result based on information included in a private or restricted resource is needed.

SUMMARY

A method and system of conducting a search, including receiving a request for information, determining whether a restricted resource is relevant to the request, allowing a human searcher to access the restricted resource based on said determining and providing a response to the request.

A method and system providing access to a resource including receiving a request for information, determining whether a restricted resource is relevant to the request, allowing a human searcher to access the restricted resource and providing a response to the request.

These together with other aspects and advantages which will be subsequently apparent, reside in the details of construction and operation as more fully hereinafter described, reference being had to the accompanying drawings forming a part hereof, wherein like numerals refer to like parts throughout.

BRIEF DESCRIPTION OF THE DRAWINGS

Aspects and advantages of the invention will become apparent and more readily appreciated from the following description of the embodiments, taken in conjunction with the accompanying drawings, of which:

FIG. 4 illustrates a database record for a user.

FIG. 5 illustrates a database record for a guide.

FIG. 6 illustrates a database record for a restricted resource.

FIG. 7 illustrates a database record for a search request.

FIG. 8 illustrates a database record for a search result.

FIG. 9 illustrates a database relationship of a keyword/category.

FIG. 11 illustrates a database relationship.

DETAILED DESCRIPTION OF THE PREFERRED EMBODIMENTS

Figure 1:
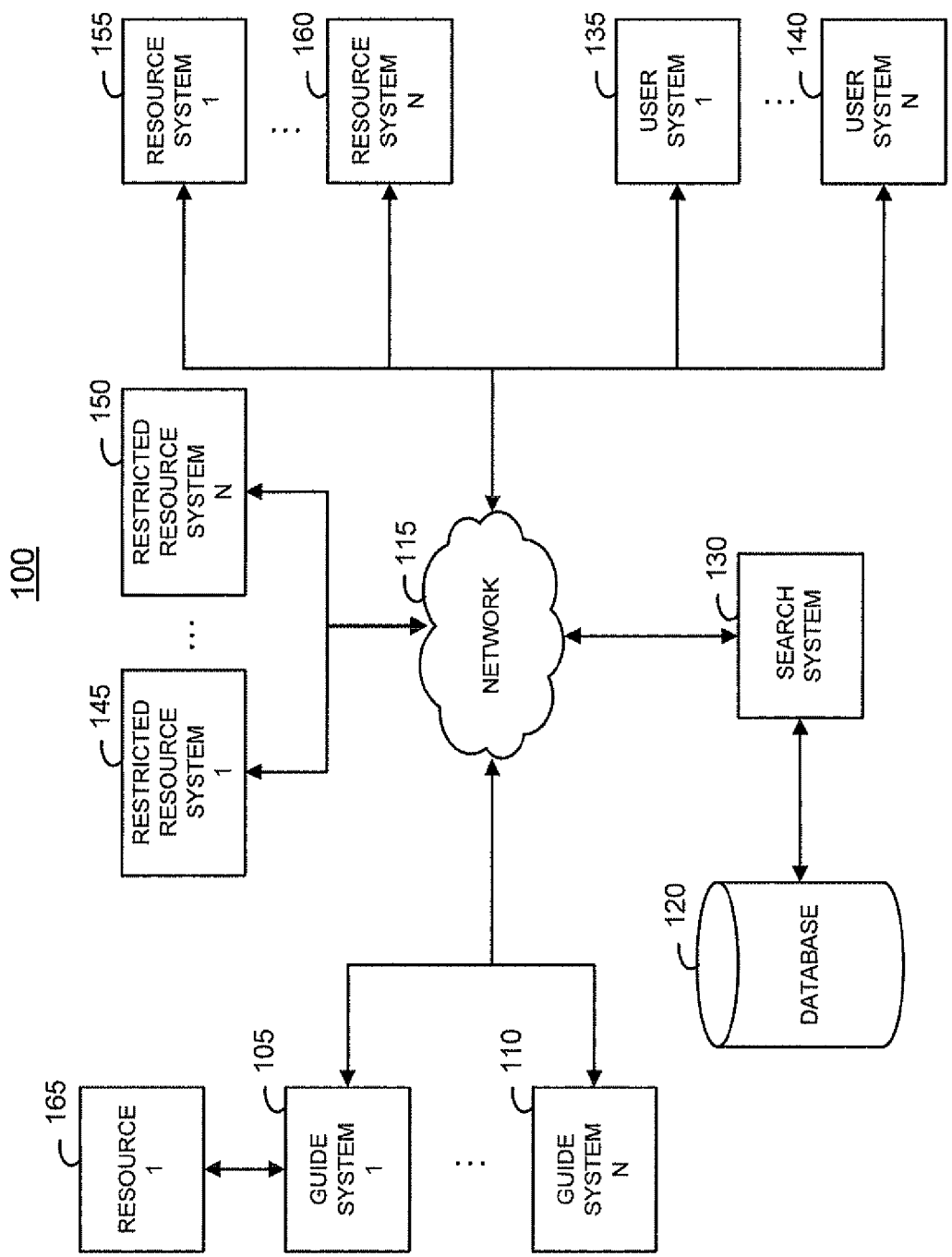
FIG. 1 is a block diagram of an exemplary system embodiment.

Reference will now be made in detail to the present embodiments discussed herein, examples of which are illustrated in the accompanying drawings, wherein like reference numerals refer to the like elements throughout. The embodiments are described below to explain the disclosed system and method by referring to the figures. It will nevertheless be understood that no limitation of the scope is thereby intended, such alterations and further modifications in the illustrated device, and such further applications of the principles as illustrated therein being contemplated as would normally occur to one skilled in the art to which the embodiments relate.

A system is provided whereby an information seeker or user (who may be any person or an entity) may submit a search request to a search system and receive a search result utilizing the assistance of a human searcher or guide. A guide may obtain a search result(s) using any information resource (s). A guide may be able to access information resource(s) which are available on restricted basis such as a subscription, purchase or other basis. A guide may obtain a search result from a restricted resource or restricted database which may be provided to a user.

A system and method is provided whereby a user may receive a response to an information search request based on information which is available from a restricted resource. The system may receive a search request from a user. A search result(s) may be provided to a user based on information obtained using a restricted resource which has been accessed by a human searcher or guide.

Access to a restricted resource may be granted to a guide(s) who are registered with a human-assisted search system. The search system includes a database which includes access information for a restricted resource(s). A search result(s) is obtained by a guide and may be returned to a user(s). Information of a search result(s), a search request(s) associated with a search result(s), a guide(s), and/or other information may be made available to automated systems, which may allow an automated system to discover information which is available from a restricted resource(s).

A restricted resource may be registered with a human-assisted search system. Access information may be provided for a private or restricted resource. A condition whereby access to the restricted resource may be granted to a guide may be determined. A condition whereby a user may access a search result obtained using a restricted resource may be determined. A resource may be associated with a category, keyword or other information which may be used to select a resource to be used for a search. In at least one embodiment, a database including a ranking and/or rating of resources which is associated with a keyword(s) and/or a category(ies) is maintained and used to select resources which are provided to a guide who responds to a user request.

A guide may be registered with a human-assisted search system. A determination may be made as to whether a guide may be eligible to access a restricted resource(s). A guide may access a restricted resource including to obtain a search result (s). A guide may be associated with a category, keyword and/or other information which may be used to select a guide to perform a search. For example, information in a database may be used to select a guide to respond to a request based on a keyword(s) associated with the request.

A user may be registered with a human-assisted search system. A determination may be made as to whether a user is eligible to receive a search result(s) obtained using a restricted database(s). As further described below, determination of whether a user is eligible to receive data obtained from a restricted resource may be based on various factor(s) including but not limited to profile of a user, existing association of the user with the resource, etc. A user may submit a search request or query, which may include a keyword(s), a phrase(s), a fully formed question(s), media such as audio, images, or video, and/or other information. A user may receive a search result(s) including information obtained using a restricted resource.

Compensation may be provided to the search system and/or a guide(s) based on advertisement(s). Compensation may be provided to the search system and/or a guide(s) based on a search result(s) provided to a user(s). Compensation may be provided to the search system and/or a guide(s) based on purchasers) made by a user(s) from a subscription database. Compensation may be provided to a provider of a restricted resource based on a search result(s) obtained from the resource and returned to a user.

A restricted resource may include any type of information source(s) which may require authorized access in order to obtain information from the resource. For example, a restricted resource may include text, graphics, images, audio, video, numeric, and/or other types of information. A restricted resource may include software which may process information included in a database in order to provide information to a user of the restricted resource. For example, access information may include a username, a password, text, images, video, audio, biometric, and/or other types of information used to authorize access to a resource such as a database. A restricted resource may be an on-line resource such as a publication (a newspaper, magazine, blog, etc.), text, music, image, audio, video or other media library or index, a website such as an auction or sales site (e.g., eBay®, Amazon®), a database system of a business such as an airline or restaurant, a collection of any sort, etc. which is accessible using electronic communication, and/or may be an off-line resource such as a print library, a book, etc.

A guide may obtain a search result(s) based on information obtained from a restricted resource and/or other resource(s) which may be accessible to one or more guides. For example, a guide(s) may obtain a search result(s) using a restricted resource(s) which may then be utilized by a guide(s) to obtain a search result(s) using a different resource(s) which may be stored in the search system and/or provided to a guide(s) and/or a user(s). Any combination of resources may be utilized by a guide(s) to obtain a search result(s).

A "user" may be any person or entity which may submit a request or search request to the search system 130 (FIG. 1). A request, search request or query is information which may be submitted using any communication service to access a search system as further described herein below.

A "guide" may be any person who may be compensated and/or may be a volunteer who may respond to and/or assist with a request. An "ambassador" is a guide who may perform processing of a request and/or a search result(s). A "searcher" is a guide who may perform an information search responsive to a request.

A "raw query" is a request submitted by a user, which may include any type of information provided by a user and/or associated with a user.

A "vetted query" includes a request which is associated with a category, a structured query, or otherwise qualified query.

A "structured query" is a question formulated according to a structured grammar. In at least one embodiment, a grammar construction required for a structured query is a question. A structured query may also be referred to as a "succinct query".

An "identifier" or ID includes character(s), number(s) and/or other type(s) of information which may be used to identify an item which is stored in the database 120 (FIG. 1). Items may include but are not limited to a guide(s), a user(s), a provider(s), a resource(s), an advertisement(s), a keyword(s), a category(ies), a search result(s), a search request(s), a query (ies), a raw query(ies), a vetted query(ies), a rating(s), ranking (s), a message(s) and/or a profile(s).

A "guided request" is a request which uses the assistance of one or more guides.

A "result" or "search result" is any information which may be provided responsive to a request. A search result includes, but is not limited to, any of an advertisement(s), a link to a web page, a message of any sort, image, audio, text, games, interactive media and/or software of any sort.

A "search resource" or "resource" is any source of information including a resource which may be used to obtain a search result. A search resource includes automated and/or human-assisted systems, any repository of information, any type of media and/or systems which may provide information. A resource may be a provider or source of item(s) and/or service(s). For example, a resource might provide an item such as a ringtone, a media file (e.g., audio, video, images, games, etc.), information such as news, lyrics, song titles, translations or any other type of information. A resource may be automated, and/or may utilize the assistance of a person(s).

A "restricted resource" is a resource to which access is restricted. Access restrictions may include security requirements, limitations on the types of information which may be provided by a resource such as resolution of images, or length of an audio file, etc. may be exclusions of certain types of access such as robot exclusions, CAPTCHA, or legal constraints of use, physical barriers to access, etc.

A "profile" is one or more characteristics which may be associated with a person. Profile characteristics include but are not limited to demographic, geographic, personality, affiliations, areas of interest, historical actions, preferences, memberships, associations, etc.

A "provider" is any provider of item(s), service(s), and/or product(s). For example, a provider of services might include a provider of a web service such as music recognition, image recognition, translation, transcription, repair, legal, advisory, personal services, etc. A provider of item(s) or product(s) might include a provider of raw or finished goods of any sort such as food products, or manufactured goods, software products such as ringtones, music or images, etc.

An "advertisement" is any information which may be delivered to a user including to promote a provider, a product, a service, etc. An advertisement may include text, audio, video, images, printed materials, interactive media such as a game, or other forms of media which may be provided to a user device.

The terms voice and speech are used interchangeably herein. A user, a restricted resource, a resource and/or a guide may establish a communication session using a voice service, a messaging service such as Short Messaging Service (SMS), Enhanced Messaging Service (EMS), Multi-media Messaging Service (MMS), Instant Messaging (IM), email, an internet portal or web page, regular mail or any other communication service. A connection may be established using any device which is capable of utilizing the relevant service. For example, a wireless device such as a cell phone, Personal Digital Assistant (PDA), smart phone, etc. might be used to establish a communication session, or a desktop, laptop or server system might be used to establish a communication session, or a landline phone, a specialized communication terminal, a set-top box, or any other communication device might be used to establish a communication session.

Communication between a guide system 105, 110, a user system 135, 140, a restricted resource system 145, 150, a resource system 155, 160, a resource 165 and/or the search system 130 may include conversion of text to speech and/or speech to text. Any type of media which can be sent or received using a communication system may be part of a communication session. A communication session may be conducted using any or all communication service(s) associated with a user, a restricted resource, a resource and/or a guide.

An advertisement may be transmitted including during any or all communication sessions between a user, a guide, a restricted resource, and/or the search system 130 (FIG. 1).

As illustrated in FIG. 1, a system 100 includes guide system(s) 105, 110, a network 115 such as the Internet, a database 120, which may comprise various records, a search system 130, user system(s) 135, 140, restricted resource system(s) 145, 150, resource systems 155, 160 and resources 165.

The network 115 (FIG. 1) may be a global public network of networks (the Internet) and/or consist in whole or in part of one or more private networks and communicatively couples the guide systems 105, 110 the user systems 135, 140, the restricted resource systems 145, 150, the resource systems 155, 160 and the resource 165 with other components of the system such as the search system 130, and the database 120.

The search system 130 allows interaction to occur between the guide systems 105, 110, the restricted resource systems 145, 150, the resource systems 155, 160, the resource 165 and the user systems 135, 140. For example, an information search query(ies) can be transmitted from the user systems 135, 140 to the search system 130, where a search query(ies) can be accessed by the guide systems 105, 110. Similarly, a search result(s) produced using the guide systems 105, 110 in response to a search query(ies) submitted by the user systems 135, 140 may be transmitted to the search system 130, where it may be stored by the search system 130 and/or may be transmitted to the user systems 135, 140. While the search system 130 is illustrated as a single system any number of servers and/or other systems may be used to implement the search system 130. For example, servers produced by Dell®, Gateway®, or IBM® might be used to implement the search system. Voice routing and packet switching may be accomplished using well established technologies such as those provided by Cisco®, or other networking companies.

A guide may be permitted to access the restricted database systems 145, 150 based on information provided by the search system 130. For example, a user of a user system (e.g., the user system 135) may be unable to access a restricted database system (e.g., the restricted resource system 145). A guide operating a guide system (e.g., the guide system 105) may be permitted to access a restricted database system (e.g., the restricted resource system 145) using information in the database 120 which may be unknown to the guide.

While only a limited number of systems associated with a human searcher (also referred to as a guide), restricted resource (also referred to as a restricted database or restricted resource) and information seeker (also referred to as a user or requester), resources and a search system are depicted in FIG. 1, it is within the scope of the disclosure for multiple systems for searcher, restricted resource, information seeker, resource and search systems to be utilized.

Any guide system (e.g., the guide systems 105, 110) can be operated including by a human searcher to obtain a search result(s) for an information seeker located at a user system(s) (e.g., the user systems 135, 140). Any user system (e.g., the user systems 135, 140) can be operated by a person or user to submit a request or search request or query to the search system 130 and/or receive a search result(s). Any restricted database system (e.g., the restricted resource systems 145, 150) may be operated by a person and/or entity and may be utilized to obtain a search result(s) which may be returned to a guide system, a user system and/or the search system 130.

A resource such as the resource systems 155, 160 and resource 165 may include any system(s), software, hardware, personnel and/or other facility(ies) which may provide information to a guide(s), a user(s), a restricted resource system and/or the search system 130. For example, a resource may be a search engine, a database system, a library, a personal hard drive and/or other local storage, printed materials, recordings of any sort, a software program(s), a person or person(s), an organization, etc. A resource may be freely accessible to any user(s) and/or guide(s) and/or may be available on a restricted basis. The restricted resource system(s) 145, 150 may include resource(s) which are available on an unrestricted and/or restricted basis based on various factor(s). For example, a resource system such as the restricted resource system 145 may include information that may be accessible to any guide on an unrestricted basis and in addition have information that may be accessible only to certain guides on a restricted basis. A resource may not be accessible using the network 115, but may be accessible to a guide(s). For example, a resource such as the resource 165 may be accessible to one or more guide(s) operating a guide system(s) such as the guide system 105 using various types of communication. For example, a guide (s) may observe and/or become aware of an event(s) that may be presented as a search result(s). Information in any form, such as printed media, audio and/or visual information, software, hardware, etc. which may be accessible to a guide(s), a user(s) and/or an operator(s) of a restricted resource system(s) may be a resource.

The search system 130 is communicatively coupled with the database 120. As will be described herein in further detail below, the database 120 includes data that is processed in association with operation(s) of the embodiments. Although FIG. 1 illustrates the database 120 as a separate component of the system, the database 120 may be integrated with the search system 130. Further, the records maintained in the database 120 may be stored in any typical manner, including in a Network Attached Storage (NAS), a Storage Area Network (SAN), etc. using any typical or proprietary database software such as DB2®, Informix®, Microsoft SQL®, MySQL®, Oracle®, etc., and may also be a distributed database on more than one server. The database may include storage media which may be used to implement the methods and/or systems described herein.

A user system, a guide system, and/or a restricted resource system may be a desktop or laptop, PC or Mac, a mobile phone, a smart phone, a PDA, a server system, a landline phone, a specialized communication terminal, a terminal connected to a mainframe, or any other communication device. The search system 130 may include one or more servers, computers, etc. After being presented with the disclosure herein, one of ordinary skill in the relevant art will immediately realize that any viable computer system(s) or communication device(s) known in the art may be used as user systems, guide systems, restricted resource systems, resources and/or to implement the search system 130.

The user systems 135, 140, the guide systems 105, 110, the search system 130, the restricted resource systems 145, 150, the resource systems 155, 160, and the resource 165 may include equipment and/or personnel required to send and/or receive messages between a user system, a guide system, a restricted resource system, a resource and/or the search system using the network 115. The database 120 includes information which may allow the search system 130 to establish communication between element(s) of the system 100. For example, speech to text and/or text to speech translation may be performed by persons, equipment and/or software operative on elements of the system 100. Likewise, a voice server, a messaging server, an email server, etc. may be included in the system 100 to allow a user to submit a query and/or receive a search result. The network 115 may include wired and/or wireless technology such as GSM, Edge, GPRS, Ethernet, DSL, IDSN, etc.

A guide may be required to register with the search system 130. As part of a registration process, at least one communication method may be associated with a guide. In at least one embodiment, a guide may register with the search system 130 and establish a username and password which are associated with the guide. A guide may login to the search system 130 using a web browser functionality of a guide system 105, 110 in order to communicate with the search system 130. Multiple communication services may be associated with a guide and may allow a communication session to be established between the search system 130 and a guide system such as the guide system 105. Multiple identifiers of a guide may be associated with each other. Information such as an IM credential(s), an email address(es), a phone number(s), a username(s), etc. of a guide may be identified which may allow the search system 130 to establish a communication session between a guide system(s) and a user system(s), a restricted resource system(s), a resource(s), and/or the search system 130.

When a guide registers with the search system 130 the guide is associated with one or more keyword(s), category(ies), profile(s) and/or other information. For example a keyword(s) and/or category(ies) may be selected by a guide, and/or may be associated with a guide based on a test(s) administered to a guide and/or other information provided during and/or after a registration process. Information associated with a guide may be stored in the database 120 and may be used for purposes such as matching a guide to a request, determining and providing compensation to a guide, communicating with a guide, allowing a guide to access a restricted database, etc. as will be described further herein below.

A guide may be allowed to access a database system (or a resource) such as the restricted resource systems 145, 150 and/or the resources 155, 160, 165. In order to access a restricted resource system, a guide may be required to meet criteria established by the search system 130 and/or a restricted resource system(s). In at least one embodiment, all guides registered with the search system 130 may be eligible to access a restricted resource system. In at least one embodiment, a restricted resource provider may designate a group(s) of registered guides to have different access rights than other guides. In at least one embodiment, a list of guides who are eligible to access a restricted resource may be provided by a provider of the restricted resource. A method of controlling access to resources associated with a group of guides or 'affiliate group' as described in the related Utility Application U.S. Ser. No. 11/834,911, entitled METHOD, SYSTEM, AND COMPUTER READABLE STORAGE FOR AFFILIATE GROUP SEARCHING, by Scott A. Jones, filed Aug. 8, 2007, which is incorporated herein by reference in its entirety may be implemented with the present invention. A method for obtaining a search result(s) using a restricted resource system such as the restricted resource system 145 is further described herein below.

A user may be identified by the search system 130. When a user system such as the user system 135 establishes a communication session with the search system 130, an identifier of the user system is determined. An identifier of a user system may be associated with other information regarding a user. A user system may be identified using an email address, a telephone number, an IM credential, a username, an IP address, and/or other identifier which may be used to associate information with a user. Multiple identifiers of a user may be associated with each other. Using information of a communication service(s) associated with a user, a communication session may be established between a user system(s) and a guide system(s), a restricted resource system(s), a resource(s) and/or the search system 130. Information such as a keyword(s), category(ies), a user profile(s), previous request(s), previous search result(s), advertisements, etc. may be associated with a user. Information of a user may be stored in the database 120.

A user may be allowed to receive a search result(s) obtained based on information from a restricted resource system such as the restricted resource systems 145, 150. In order to access a search result(s), a user may be required to meet criteria established by the search system 130 and/or a restricted resource system. In at least one embodiment, all users of the search system 130 may be eligible to access a search result(s) obtained based on information from a restricted resource system. In at least one embodiment, a restricted resource provider may designate a group(s) of registered users to have different access rights than other users. In at least one embodiment, information of users who are eligible to access a search result(s) obtained based on information from a restricted resource may be provided by the provider of the restricted resource. For example, information of a user's record (FIG. 4) may be utilized by a provider of a restricted resource to identify user(s) that are eligible to access data retrieved from the resource.

A provider of a restricted resource, which may be a person(s) or entity(ies), may be identified by the search system 130. Information of at least one type of communication is associated with a restricted resource system which allows a communication session to be established between a restricted resource system and the search system 130. An identifier of a restricted resource system may be associated with other information regarding a restricted resource. A restricted resource system may be identified using an email address(es), a telephone number(s), an Instant Message (IM) credential(s), a restricted resource username(s), a URL(s) and/or other identifier(s) which may be used to associate information with a restricted resource. Multiple identifiers of a restricted resource may be associated with each other. Using the information of communication services associated with a restricted resource, a communication session may be established between a restricted resource system such as the restricted resource system 145 and a user system(s), a guide system(s), a resource(s) and/or the search system 130. Information such as a keyword(s), a category(ies), a profile(s), or other information may be associated with a restricted resource. Information of a restricted resource may be stored in the database 120.

The search system 130 may be able to establish a communication session between any user system(s), guide system(s), a resource system(s) and/or restricted resource system(s) using information indicated in the database 120. For example, the user system 135 may establish a voice communication session with the search system 130, and subsequently the search system 130 may establish a voice communication session between the user system 135 and the guide system 105. Alternatively, a user system 135 may establish a voice communication with the search system 130, and subsequently the search system 130 may establish a Web based communication with the guide system 105, which may in turn establish a Web based communication session with the restricted resource system 145, or any number of restricted resource systems. The restricted resource system 145 may alternatively establish a Web based communication session with the search system 130, and/or subsequently the search system 130 may establish an SMS communication session between the user system 135 and the guide system 105. While certain communication sessions are used in this example, any type of communication session using one or more services such as voice, SMS, EMS, MMS, email, IM, chat, Web based communication, etc. may be established between any user system(s), guide system(s), resource system(s) and/or restricted resource system(s) and/or the search system 130 using the network 115.

Figure 2:
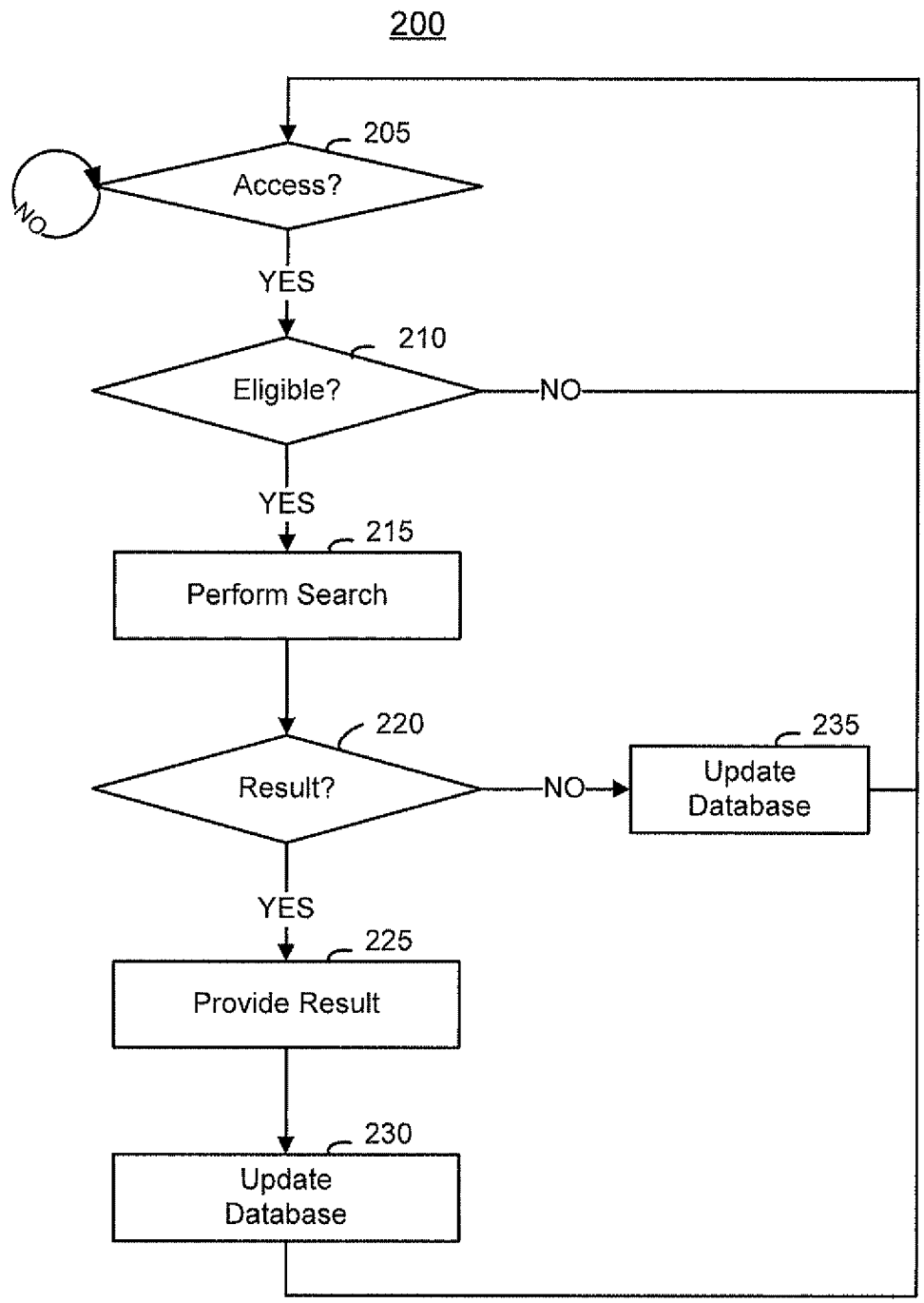
FIG. 2 is a flowchart of a process for obtaining a search result from a restricted resource.

As illustrated in FIG. 2, a process 200 for obtaining a search result from a restricted resource is provided. The process 200 may be active on a server associated with a restricted resource system, for example, the 'Restricted Resources System N' 150.

In operation 205 a determination is made as to whether a request for access to a restricted resource is received. If in operation 205 it is determined that a request for access to a restricted resource is not received, control remains at operation 205 and process 200 continues to wait. If in operation 205 it is determined that a request for access to a restricted resource is received, control is passed to operation 210 and process 200 continues.

The determination in operation 205 may be made based on various criteria. For example, an access request may be received at a server of a restricted resource system, or a voice message may be received at an access number associated with a restricted resource system, or a text, IM email, EMS, MMS, or other message may be received by a device associated with a restricted resource system. Any type of communication service(s) associated with a restricted resource system may be utilized to generate a request for access to a restricted resource.

In operation 210 a determination is made as to whether a guide is eligible to access a restricted resource. If in operation 210 it is determined that a guide is not eligible to access a restricted resource, control is passed to operation 205 and process 200 continues. If in operation 210 it is determined that a guide is eligible to access a restricted resource, control is passed to operation 215 and process 200 continues.

The determination in operation 210 may be made based on various criteria. Any information associated with a guide may be compared to information associated with a restricted resource to determine whether a guide is eligible to access a restricted resource. For example, an identifier of a guide may be compared to a list of identifiers associated with a restricted resource in order to determine whether a guide is eligible to access a restricted resource. A qualification(s), a keyword(s), a ranking(s), a category(ies), geographic, demographic, personality and/or any other information indicated in the database 120 may be used to determine whether a guide is eligible to access a restricted resource. For example, a number of guides who are currently accessing a restricted resource, a proficiency test result(s) associated with a guide(s), a rating(s) associated with a guide, a usage indication of a restricted resource, an employer or organization associated with a guide, etc. may be used to determine whether a guide is eligible to access a restricted resource. In at least one embodiment, security information may be provided by the search system 130 (FIG. 1) to determine if a guide is eligible to access a restricted resource. For example, the search system 130 may provide access to a restricted resource via a link sent to a guide. Access to a restricted resource may be a Web link which may be a URL with a tag or identifier associating the URL with information necessary to access a restricted resource.

In operation 215 a search is performed utilizing a restricted resource. A guide may perform a search utilizing a restricted resource including in combination with other resource(s). Any type of search process may be used. For example, a guide may submit a search request to a server associated with a restricted resource, or a guide may consult an index of a restricted resource in order to locate information in a restricted resource, a guide may utilize a software application to search a document and/or corpus of documents included in a restricted resource, and/or a guide may interact with a person(s) to obtain information included in a restricted resource, etc. Information indicated in a restricted resource may be utilized to perform a search using any resources. Information obtained from a restricted resource might be used to obtain a search result(s) which was not included in the restricted resource. For example, in response to a user submitted request for 'who predicted the performance of MRO best in 2008?', a guide may perform a search utilizing a restricted resource (e.g. a report by a forecasting company) to find a rating forecast, use a public resource for a current quote for MRO and provide a response to a user indicating the best forecasting company. Control is passed to operation 220 and process 200 continues.

Further, an automated search may be performed without requiring assistance from a guide and a result may be automatically received and provided to a user requesting information. For example, a user may submit a request that triggers a search without a guide, at which point the search system 130 (FIG. 1) executes an automated search including using a restricted resource and provides resultant data as a response to the request.

In operation 220 a determination is made as to whether a search result(s) is obtained. If in operation 220 it is determined that a search result(s) is not obtained control is passed to operation 235 and process 200 continues. If in operation 220 it is determined that a search result(s) is obtained control is passed to operation 225 and process 200 continues.

The determination in operation 220 may be made be made based on various criteria. A guide action(s) may determine whether a search result(s) is obtained. For example, a guide may activate an action control which indicates that a search result(s) is obtained. The search system 130 (FIG. 1) may determine whether a search result(s) is obtained. For example, a message(s) may be received from a guide system, a user system, a resource and/or a restricted resource system which may indicate that a search result(s) is obtained. System condition(s) may determine whether a search result(s) is obtained. For example, a time interval may expire which may indicate that a search result(s) is not obtained. Any suitable criteria may be utilized to determine whether a search result(s) is obtained.

In operation 235 the database 120 (FIG. 1) is updated. The database 120 may be distributed in any of the elements of the system 100. For example, the database 120 may be associated with a restricted resource system(s) and/or a resource system(s) and communicatively coupled with the search system 130. Information regarding a guide, a user, a restricted resource, a request, a resource or any other information obtained during process 200 may be recorded in the database 120. For example, a number of usages or rating(s) of a restricted resource may be updated, an indicator that a restricted resource and/or a guide was not able to provide a search result(s) may be recorded, access information associated with a guide may be updated, and/or other information associated with a user, a guide, a request, a restricted resource, a search result(s), etc. may be recorded or updated. Control is passed to operation 205 (FIG. 2) and process 200 continues.

In operation 225 a search result is provided. For example, information of a search result obtained in operation 215 may be provided to the search system 130, recorded in the database 120 (FIG. 1), and/or returned to a user. A search result may be provided to the search system 130 and/or to a user(s) via a user system(s). Information of a search result obtained in operation 215 may be combined with information from other sources, and provided to the search system 130 and/or a user(s). Control is passed to operation 230 (FIG. 2) and process 200 continues.

In operation 230 the database 120 (FIG. 1) is updated. Information regarding a guide, a user, a restricted resource, a request, a search result(s) or any other information may be recorded in the database 120. For example, a number of usages or rating(s) of a restricted resource may be updated, an indicator that a restricted resource and/or a guide was able to provide a search result(s) may be recorded, access information associated with a guide may be updated, and/or other information associated with a user(s), a guide(s), a request(s), a restricted resource(s), a search result(s), etc. may be recorded or updated. Further, search result(s) may be associated with a category, keyword, etc., according to relevance and/or content thereof and stored in the database 120 (FIG. 1). Control is passed to operation 205 (FIG. 2) and process 200 continues.

Figure 3:
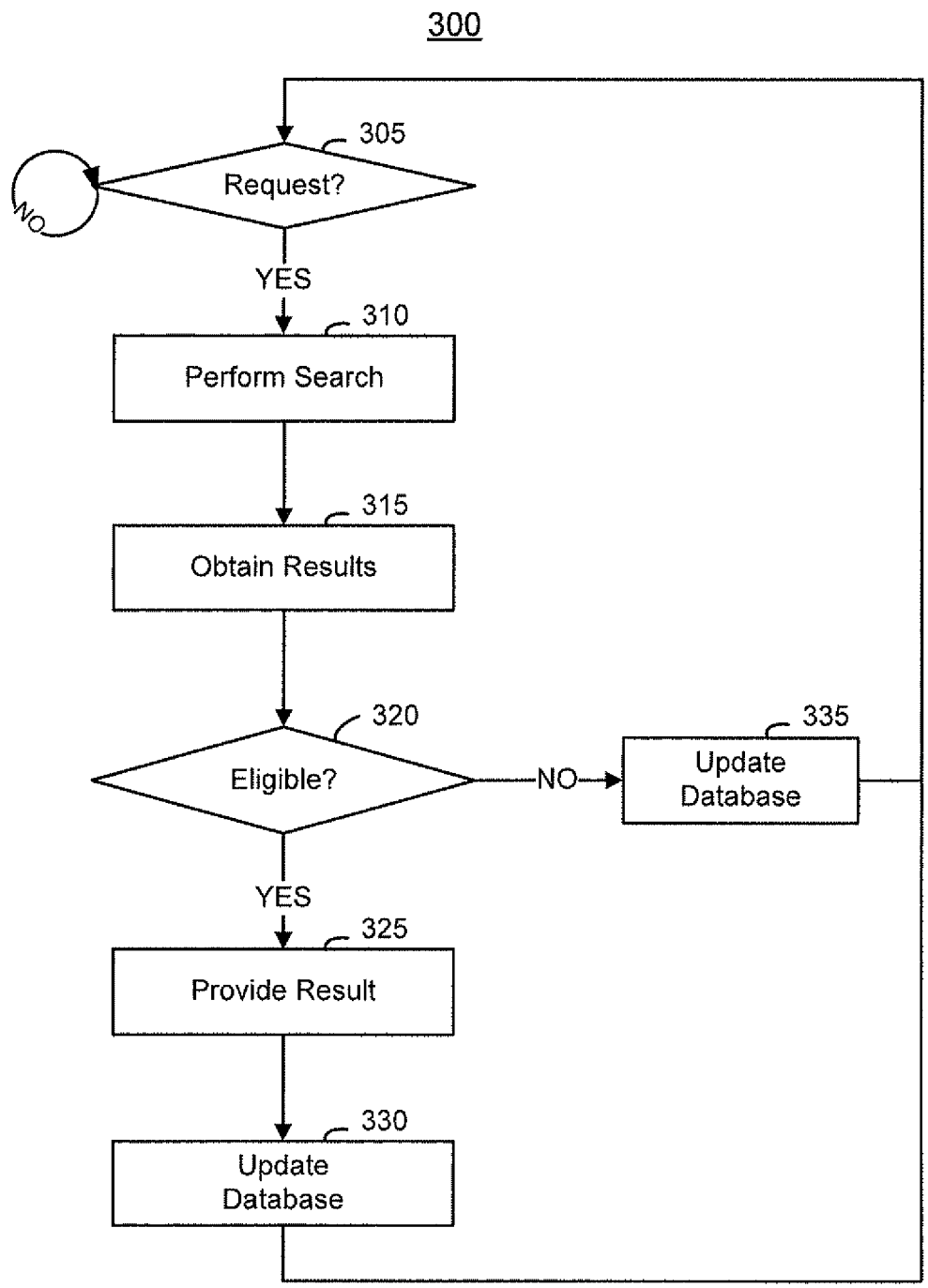
FIG. 3 is a flowchart for performing a search.

As illustrated in FIG. 3, a process 300 for performing an information search is provided. The process 300 may be operative on a server associated with the search system 130 (FIG. 1).

In operation 305 a determination is made as to whether a search request is received. If in operation 305 it is determined that a search request is not received, control remains at operation 305 and process 300 continues to wait. If in operation 305 it is determined that a search request is received, control is passed to operation 310 and process 300 continues.

The determination in operation 305 may be made based on various criteria. For example, a search request may be received at a server of the search system 130 (FIG. 1), or a voice connection may be received at an access number associated with the search system 130, or a SMS, IM, email, EMS, MMS, or other message may be received by a device associated with the search system 130. Any type of communication service(s) associated with the search system 130 may be utilized to submit a search request.

In operation 310 (FIG. 3) an information search is performed. A guide may perform a search and/or an automated search may be performed by the system 130 (FIG. 1). Control is passed to operation 315 and process 300 continues.

In operation 315 a search result(s) is obtained. A search result(s) may be provided using information obtained from any resource(s) available to the search system 130 (FIG. 1). A search result(s) may include a search result(s) obtained using a restricted resource(s). Control is passed to operation 320 (FIG. 3) and process 300 continues.

In operation 320 a determination is made as to whether a user is eligible to receive a search result(s). If in operation 320 it is determined that a user is not eligible to receive a search result(s), control is passed to operation 335 and process 300 continues. If in operation 320 it is determined that a user is eligible to receive a search result(s), control is passed to operation 325 and process 300 continues.

The determination in operation 320 may be made based on various criteria. Information associated with a user may be used to determine whether a user is eligible to receive a search result(s). For example, a user identifier(s) may be compared to a list of user identifier(s) associated with a restricted resource to determine whether a user is eligible to receive a search result(s), or a number of search results provided to a user which are associated with a restricted resource may be used to determine whether a user is eligible to receive a search result(s). Information associated with a guide(s) may be utilized to determine whether a user is eligible to receive a search result(s). For example, a user may not be eligible to receive a search result(s) obtained using a restricted resource by a guide who is no longer eligible to obtain a search result(s) utilizing a restricted resource. Any information indicated in the database 120 (FIG. 1) may be utilized to determine whether a user is eligible to receive a search result(s). In at least one embodiment, any user may be determined to be eligible to receive any search result(s).

The determination that whether a user or a guide is eligible to access a resource that has limited access may be based on various factor(s) including an existing subscription of the user and/or guide. For example, a user submitting a request may have provided membership/subscription information when registering with the search system 130 (FIG. 1) that may be utilized to authorize the user to access a particular resource.

In operation 325 (FIG. 3) a search result(s) is provided to a user. A search result(s) may be provided to a user utilizing any or all user system(s) associated with the user. The search result(s) obtained in operation 315 and/or other information may be provided to the search system 130 and/or user(s). For example, in response to a request for a guide assisted search, information from a resource having a restricted access (e.g., subscription based) may be combined with information compiled by a guide and provided as a search result. Control is passed to operation 330 and process 300 continues.

In operation 330 the database 120 (FIG. 1) is updated. Information regarding a user(s), a guide(s), a search result(s), a restricted resource(s), a resource(s), a request(s), and/or other information may be recorded. For example, an indication that a search result(s) has been provided to a user(s) may be recorded, or information that a search result(s) have been associated with a request may be recorded, etc. Rating information may be recorded. For example, a user rating of a search result(s) and/or a guide(s) may be recorded. Control is passed to operation 305 (FIG. 3) and process 300 continues.

In operation 335 the database 120 (FIG. 1) is updated. Information regarding a user(s), a guide(s), a search result(s), a restricted resource(s), a resource(s), a request(s), and/or other information may be recorded. For example, an indication that a search result(s) has not been provided to a user(s) may be recorded, or information that a search result(s) have been associated with a request may be recorded, etc., which may provide an automatic response to an authorized user. Rating information may be recorded. For example, a user rating of a search result(s) and/or a guide(s) may be recorded. Control is passed to operation 305 (FIG. 3) and process 300 continues.

As illustrated in FIG. 4, an exemplary user record 400 is provided, of which one or more may be associated with or resident in the search database 120 (FIG. 1) is provided. The user record 400 may include a user record ID field 405 (FIG. 4), a user channel ID field 410, a user request ID 415, and a user result ID field 420.

The user record ID field 405 contains an identifier of a user, which is preferably unique and preferably used consistently. For example, in at least one embodiment, the user record ID field 405 can include a randomly generated numerical code, and/or a string indicating a user. A user record ID serves to distinguish a user record associated with a user from a user record associated with other user(s). Although particular examples of identifiers are described herein, other types of identifiers uniquely indicating a user(s) may be utilized without departing from the spirit and scope of the embodiments herein. In at least one embodiment, a telephone number associated with a mobile phone service account may be included in the content of the user record ID field 405. A user record ID may include a username, an IM credential, an email address, a persistent 'cookie', an IP address, a URL, etc. Using the example in FIG. 4, '502.331.2204-4772' is the user record ID associated with the user record 400.

The user channel ID field 410 may include one or more identifiers associated with a user. The user channel identifier ID field 410 may include one or more identifiers of a user and/or other information which may be used to establish communication with a user system. For example, a telephone number, an email address, an IM credential, a username, etc. may be included in the user channel identifier field 410. Using the example in FIG. 4, the telephone number '502.331.2204' and the email address 'usertom@chacha.com' are the user channel identifiers which have been associated with the user '502.331.2204-4772'. While only a few channel identifiers have been illustrated in, any number of channel identifiers may be associated with a user.

The user request ID field 415 may include information of one or more requests associated with a user identifier. For example, the user request ID field 415 may include a unique identifier(s) associated with a user request(s) submitted using a user system associated with any channel identifier associated with a user. Using the example illustrated in FIG. 4, the user request ID 'are there mountain gorillas in zimbabwe', and the user request ID 'usertom@chacha.com,12.48.08, 13 Oct. 2006' have been associated with the user '502.331.2204-4772'.

The user result ID field 420 may include information of one or more search results associated with a user ID. For example, the user result ID field 420 may include a unique identifier associated with a search result(s) provided to a user system associated with any channel identifier associated with a user. In at least one embodiment, the user request ID field 415 and the user result ID field 420 may be linked by, for example, a pointer. Using the example illustrated in FIG. 4, the results 'www.awebsite.com', 'there are 50 mountain gorillas in zimbabwe', and 'www.dictionary.com' have been associated with the user '502.331.2204-4772'. This may indicate that the results 'www.awebsite.com' and 'there are 50 mountain gorillas in zimbabwe' have been provided responsive to the request 'are there mountain gorillas in zimbabwe' and that the result 'www.dictionary.com' was provided responsive to the request 'usertom@chacha.com, 12.48.08, 13 Oct. 2006'.

As illustrated in FIG. 5, an exemplary a guide record 500 is provided, of which one or more may be associated with or resident in the database 120 (FIG. 1). The guide record 500 may include a guide record ID field 505, a guide channel ID field 510, a guide request ID field 515, a guide result ID field 520, and a guide keyword/category ID field 525.

The guide record ID field 505 contains an identifier of a guide, which is preferably unique and preferably used consistently. For example, in at least one embodiment, the guide record ID field 505 can include a randomly generated numerical code, and/or a string indicating a guide. A guide record ID serves to distinguish a guide record associated with a guide from a guide record associated with other guide(s). Although particular examples of identifiers are described herein, other types of identifiers uniquely indicating a guide(s) may be utilized without departing from the spirit and scope of the embodiments herein. In at least one embodiment, a guide record ID may include a first and/or last name of a guide. In at least one embodiment, a telephone number associated with a mobile phone service account may be included in the content of the guide record ID field 505. A guide record ID may include a guide username, an IM credential, an email address, a telephone number, a URL, etc. Using the example illustrated, 'bob smith' is the guide record ID associated with the guide record 500.

The guide channel ID field 510 may include one or more identifiers associated with a guide. The guide channel ID field 510 may include one or more identifiers of a guide and/or other information which may be used to establish communication with a guide system. For example, a telephone number, an email address, an IM credential, a username, a URL, etc. may be included in the guide channel ID field 510. Using the example in FIG. 5, the telephone number '317.244.2444' and the email address 'guidebob@chacha.com' are the guide channel identifiers which have been associated with the guide 'bob smith'. While only a few channel identifiers have been illustrated, any number of channel identifiers may be associated with a guide.

The guide request ID field 515 may include information of one or more requests associated with a guide. For example, the guide request ID field 515 may include a unique identifier (s) associated with a user request(s) which have been assigned to a guide. Using the example illustrated in FIG. 5, the request 'are there mountain gorillas in zimbabwe', and the request '502.455.3301,12.48.08, 13 Oct. 2006' have been associated with the guide 'bob smith'. This may indicate that the guide 'bob smith' has been selected to respond to the requests 'are there mountain gorillas in zimbabwe', and '502.455.3301, 12.48.08, 13 Oct. 2006'.

The guide result ID field 520 may include information of one or more search results associated with a guide. The content of the guide result ID field 520 may include one or more indicators of a search result(s) provided by a guide. In at least one embodiment, the guide request ID field 515 and the guide result ID field 520 are linked by, for example, a pointer. Using the example illustrated in FIG. 5, the result record ID 'there are 50 mountain gorillas in zimbabwe', and the result record ID 'a stone is equal to 14 pounds' have been associated with the guide 'bob smith'. This may indicate that the results 'there are 50 mountain gorillas in zimbabwe', and 'a stone is equal to 14 pounds' were produced by the guide 'bob smith' responsive to the queries 'are there mountain gorillas in zimbabwe' and '502.455.3301,12.48.08, 13 Oct. 2006' respectively.

The guide keyword/category ID field 525 may include information of one or more keyword(s)/category(ies) associated with a guide. The content of the guide keyword/category ID field 525 may include one or more indicators of a keyword/category(ies) associated with a guide. Using the example illustrated in FIG. 5, the keyword/category record ID 'stone_science>physics>measurement', and the keyword/category record ID 'zimbabwe_geography>africa' have been associated with the guide 'bob smith'. This may indicate that the guide 'bob smith' is registered to respond to a search request(s) associated with the keyword and category 'stone_science>physics>measurement', and 'zimbabwe_geography>africa'. In at least one embodiment, a guide(s) may be selected to respond to a search request(s) based on a keyword(s) and/or category(ies) associated with a search request and/or a guide. While ranking of a guide(s) is illustrated using the specific example of a categorized keyword, other methods ranking and/or selecting a guide to respond to a search request may be used within the spirit and scope of the disclosure herein.

A categorized keyword is a keyword, which may include any number of words and/or phrases, which has been associated with a category. In at least one embodiment, if a guide is associated with a categorized keyword or "qualified keyword", the guide is associated with the category associated with the keyword. A rating(s) of a guide associated with one or more qualified keywords (QKW) may be used to determine a rating(s) of a guide associated with a category which is common to the QKW's. If a query contains a keyword and is categorized as belonging to the category associated with a QKW, a rating(s) of a guide(s) associated with the QKW may be given increased weighting in selection of a guide to respond to the query. Likewise other items such as advertisements, search results, etc. associated with a QKW may be more likely to be selected.

As illustrated in FIG. 6, an exemplary restricted resource record 600 is provided, of which one or more may be associated with or resident in the search database 120 (FIG. 1). The restricted resource record 600 may include a restricted resource record identifier (ID) field 605 (FIG. 6), a restricted resource channel identifier ID field 610, a restricted resource access information field 615, a restricted resource guide ID field 620, a restricted resource user ID field 625, a restricted resource request ID field 630, a restricted resource result ID field 635 and a restricted resource keyword/category ID field 640.

The restricted resource record ID field 605 contains an identifier of a restricted resource, which is preferably unique and preferably used consistently. For example, in at least one embodiment, the restricted resource record ID field 605 can include a randomly generated numerical code, and/or a string indicating a restricted resource. A restricted resource record ID serves to distinguish a restricted resource record associated with a restricted resource from a restricted resource record associated with other restricted resource(s). Although particular examples of identifiers are described herein, other types of identifiers uniquely indicating a restricted resource (s) may be utilized without departing from the spirit and scope of the embodiments herein. In at least one embodiment, the restricted resource record ID is a URL. A restricted resource record ID may include a restricted resource URL, phone number, an IM credential, an email address, etc. Using the example in FIG. 6, 'national geographic' is the restricted resource record ID associated with the restricted resource record 600.

The restricted resource channel identifier ID field 610 may include one or more identifiers associated with a restricted resource. The restricted resource channel identifier ID field 610 may include one or more identifiers of a restricted resource and/or other information which may be used to establish communication with a restricted resource system. For example, a telephone number, an email address, and IM credential, a username, a URL, etc. may be included in the restricted resource channel identifier field 610. Using the example in FIG. 6, the URL 'https://nationalgeographic.com' and the email address 'questions@nationalgeographic.com' are the restricted resource channel identifiers which have been associated with the restricted resource 'national geographic'. This may indicate that a communication session may be established with a restricted resource 'national geographic' using the URL 'https://nationalgeographic.com' and/or by sending email to the email address 'questions@nationalgeographic.com'. While only a few channel identifiers have been illustrated in FIG. 6, any number of channel identifiers may be associated with a restricted resource.

The restricted resource access information field 615 may include information regarding how a restricted resource may be accessed. For example, the restricted resource access information field 615 may include a username and/or password which may be required to access information of a restricted resource. While a few usernames and passwords have been used for purposes of illustration, multiple username(s) and/or password(s) might be associated with a restricted resource. For example, a username(s) and/or password(s) may be associated with a guide(s) and/or group(s) of guides associated with a restricted resource. Access information which might be based on other types of data such as an encryption key, or any other type of access information which may be required to permit access to information in a restricted resource may be included in the restricted resource access information field 615. The information indicated in the restricted resource access information field 615 may not be available to a guide(s). A guide(s) may be granted access to a restricted resource based on access information associated with a guide. Using the example illustrated in FIG. 6, the usernames 'chachaguides', 'chachasms', and 'mountain' and the passwords 'getbetteranswers', 'getbetteranswers2' and 'getbetteranswers3' have been associated with the restricted resource 'national geographic'.

The restricted resource guide ID field 620 may include information of one or more guides associated with a restricted resource. For example, the restricted resource guide ID field 620 may include a unique identifier(s) associated with a guide (s) who has been granted access to a restricted resource. A guide may be associated with any number of restricted resource(s). The restricted resource guide ID field 620 may indicate a group of guides such as guides associated with a keyword(s), an employer(s), etc. For example, a first set of guides registered to perform searches associated with a first keyword and/or category may be provided with access to a first restricted resource, while a second set of guides associated with a second keyword and/or category are able to access a second restricted resource.

Information included in the restricted resource guide ID field 620 may be compared to information associated with a guide(s) in order to determine whether the guide is eligible to access a restricted resource. Using the example illustrated in FIG. 6, the guide ID 'bob smith', the guide 'tom thomas' and the guide group 'chachatext' have been associated with the restricted resource 'national geographic'. This may for example, indicate that the guides 'bob smith' and 'tom thomas' may access the database 'national geographic' using the username 'chachaguides' and the password 'getbetteranswers' and that guides associated with the group 'chachatext' may access the database 'national geographic' using username 'chachasms' and the password 'getbetteranswers2' and that guides associated with the keyword/category 'mountain gorillas_science>biology>primates' as indicated in the restricted resource keyword category ID field 640 may access the database 'national geographic' using the username 'mountain' and the password 'getbetteranswers3'. Access rights associated with a username(s) and/or password(s) may be determined by a restricted resource operator. Different access rights and/or access to different resources may be associated with a different username(s) and/or password(s). For example, the provider of the search system 130 (FIG. 1) might control an explicit list of guides who may access the resource (i.e. 'bob smith' and 'tom thomas'), a group of guides (i.e., chachatext) which may have a dynamic membership may be allowed to access a restricted resource, and/or a group of guides associated with a keyword(s) and/or category (ies) (e.g. 'mountain gorillas_science>biology>primates') using different privileges and/or access.

The restricted resource user ID field 625 may include information of one or more users associated with a restricted resource. For example, the restricted resource user ID field 625 may include a unique identifier(s) associated with a user (s) who have been granted access to a search result(s) obtained using information included in a restricted resource. A user may be associated with any number of restricted resource(s). The restricted resource user ID 625 may indicate a group of users such as users associated with a keyword(s), an employer(s), etc. Information included in the restricted resource user ID field 625 may be compared to information associated with a user(s) in order to determine whether a user is eligible to receive a search result(s) obtained using information included in a restricted resource. Using the example illustrated in FIG. 6, the user 'rob roberts', the user ID '414.311.3344' and the user group 'anyuser' have been associated with the restricted resource 'national geographic'. This may for example, indicate that the users 'rob roberts' and '414.311.3344' may access a search result(s) produced using the user name 'chachaguides' and the password 'getbetteranswers' and that 'anyuser' may access a search result(s) produced using the username 'chachasms' and the password 'getbetteranswers2'.

The restricted resource request ID field 630 may include information of one or more requests or search requests associated with a restricted resource. For example, the restricted resource request ID field 630 may include a unique identifier (s) associated with a request(s) which have generated an access request to a restricted resource. A request may be associated with any number of restricted resource(s). Information in the restricted resource request ID field 630 may be used to determine a user(s), guide(s), keyword(s), category (ies), etc. associated with a search request which accesses a restricted resource. Using the example illustrated in FIG. 6, the request ID 'are there mountain gorillas in zimbabwe' and the request ID '414.311.3344, 13.15.08, 14 Oct. 2006' have been associated with the restricted resource 'national geographic'. This may for example, indicate that a guide responding to the request 'are there mountain gorillas in zimbabwe' and/or the request '414.311.3344, 13.15.08, 14 Oct. 2006' accessed the restricted resource 'national geographic'.

The restricted resource result ID field 635 may include information of one or more results or search results associated with a restricted resource. For example, the restricted resource result ID field 635 may include a unique identifier(s) associated with a result(s) which have been produced using a restricted resource. Information in the restricted resource result ID field 635 may be used to determine a user(s), guide (s), keyword(s), category(ies), a request(s), etc. associated with a search result which was produced using a restricted resource. Using the example illustrated in FIG. 6, the result ID 'there are 50 mountain gorillas in zimbabwe', the result ID 'there are four hundred mountain gorillas in captivity' and the result ID 'there are 27 known species of ferns in indiana' have been associated with the restricted resource 'national geographic'. This may indicate that the result 'there are 50 mountain gorillas in zimbabwe', the result 'there are four hundred mountain gorillas in captivity', and the result 'there are 27 known species of ferns in indiana' were produced using the restricted resource 'national geographic'.

The restricted resource keyword/category ID field 640 may include information of one or more keywords/categories associated with a restricted resource. For example, the restricted resource keyword/category ID field 640 may include a unique identifier(s) associated with a keyword(s) and/or category(ies) associated with a restricted resource. A guide(s) associated with a keyword(s) and/or category(ies) associated with a restricted resource may be granted access to a restricted resource using information indicated in the restricted resource access information field 615. Using the example illustrated in FIG. 6, the keyword/category 'mountain gorillas_science>biology>primates' has been associated with the restricted resource 'national geographic'. This may for example indicate that a guide(s) associated with the keyword/category 'mountain gorillas_science>biology>primates' may be allowed to access the restricted resource 'national geographic' as described herein above. A group of users and/or guides may be identified and associated with access information of a restricted resource(s) based on a keyword(s), category(ies), and/or any other information which may be associated with a guide and/or a user(s) and a restricted resource. Although FIGS. 4-6 are described using specific types of search result (s), the present invention is not limited to any type of result(s) and may include text, URLs, audio, images, or video, and/or other information.

As illustrated in FIG. 7, an exemplary request record 700 is provided, of which one or more may be associated with or resident in the search database 120 (FIG. 1). The request record 700 may include a request record identifier (ID) field 705 (FIG. 7), a user ID field 710, a guide ID field 715, a result ID field 720, and a keyword/category ID field 725.

The request record ID field 705 contains an identifier of a request, which is preferably unique and preferably used consistently. For example, in at least one embodiment, the request record ID field 705 can include a randomly generated numerical code, and/or a string indicating a request. A request record ID serves to distinguish a request record associated with a request from a request record associated with other request (s). Although particular examples of identifiers are described herein, other types of identifiers uniquely indicating a request(s) may be utilized without departing from the spirit and scope of the embodiments herein. In at least one embodiment, the request record ID includes a string indicating content of a search request. A request record ID may include a username, an IM credential, an email address, etc. Using the example in FIG. 7, 'are there mountain gorillas in zimbabwe' is the request record ID associated with the request record 700.

The user ID field 710 may include an identifier of a user(s) who submitted a request. The content of the user ID field 710 may be used to establish communication with a user(s) based on content of a user record such as the user record 400 (FIG. 4). Using the example in FIG. 7, the user '502.331.2204-4772' and the user 'ralph rogers' are associated with the request record 700, which may indicate that the users '502.331.2204-4772' and 'ralph rogers' submitted a request with the request ID 'are there mountain gorillas in Zimbabwe', and may be presented with a result(s) identified in the result ID field 720.

The guide identifier ID field 715 may include information of one or more guides associated with a request. The content of the guide identifier field 715 may be used to establish communication with a guide based on the content of a guide record such as the guide record 500 (FIG. 5). Using the example illustrated in FIG. 7, the guides 'curious george', 'bob smith', and '502.330.1454' have been associated with the request record 700, which may indicate that the guides 'curious george', 'bob smith', and '502.330.1454' have been selected to respond to a request associated with the request ID 'are there mountain gorillas in Zimbabwe'.

The result identifier ID field 720 may include information of one or more search results associated with a request. Content of the result identifier ID field 720 may be used to indicate a result which has been associated with a request or search query. Using the example illustrated in FIG. 7, the search results 'www.awebsite.com' and 'there are 50 mountain gorillas in Zimbabwe' have been associated with the request record 700. This may indicate that the results 'www.awebsite.com' and 'there are 50 mountain gorillas in zimbabwe' have been provided responsive to the request 'are there mountain gorillas in Zimbabwe'.

The keyword and category ID field 725 may include information of one or more keyword and categories associated with a request. The content of the keyword and category ID field 725 may be used to indicate a keyword and/or category (ies) which has been associated with a request or search query. Using the example illustrated in FIG. 7, the keyword/categories 'mountain gorillas_science>biology>primates' and "zimbabwe_geography>africa" have been associated with the request record 700. This may indicate that the category and/or keywords may be utilized to select a guide(s), a search result(s), an advertisement, or other information responsive to a search request with the request ID 'are there mountain gorillas in zimbabwe'.

As illustrated in FIG. 8, an exemplary result record 800 is provided, of which one or more may be associated with or resident in the search database 120 (FIG. 1). The result record 800 may include a result record ID field 805 (FIG. 8), a result guide ID field 810, a result resource ID field 815, a result keyword/category ID field 820, and a result usage info field 825.

The result record ID field 805 contains an identifier of a result, which is preferably unique and preferably used consistently. For example, in at least one embodiment, the result record ID field 805 can include a randomly generated numerical code, and/or a string indicating a result. A result record ID serves to distinguish a result record associated with a result from a result record associated with other result(s). Although particular examples of identifiers are described herein, other types of identifiers uniquely indicating a result(s) may be utilized without departing from the spirit and scope of the embodiments herein. Using the example in FIG. 8, 'there are 50 mountain gorillas in zimbabwe' is the result record ID associated with the result record 800.

The result guide ID field 810 may include an identifier of a guide(s) that obtained a result. The content of the result guide ID field 810 may be used to establish communication with a guide(s) based on the content of a guide record such as the guide record 500 (FIG. 5). Using the example in FIG. 8, the guide 'bob smith' is associated with the result record 800, which may indicate that 'bob smith' has obtained the result 'there are 50 mountain gorillas in zimbabwe'.

The result resource ID field 815 may include an identifier of a resource(s) which have been utilized to obtain a result. The content of the result resource ID field 815 may be used to determine how a result was produced, whether a stored search result should be attributed to a resource, a rating of a resource and/or the result, etc. Using the example in FIG. 8, the resource 'national geographic' is associated with the result 'there are 50 mountain gorillas in zimbabwe', which may indicate 'national geographic' has been utilized to obtain the result 'there are 50 mountain gorillas in zimbabwe'.

The result keyword/category ID field 820 may include an identifier of a keyword and/or category associated with a result or search result. The content of the keyword/category ID field 820 may be used to determine a rating of a search result, whether a stored search result should be provided to a user, etc. Using the example in FIG. 8, the QKW 'mountain gorillas_science>biology>primates' is associated with the result 'there are 50 mountain gorillas in zimbabwe'. If a query contains the keyword 'mountain gorillas' and/or is associated with the category 'science>biology>primates' the result 'there are 50 mountain gorillas in zimbabwe' may be provided to responsive to the request.

The result usage info field 825 may include an indication of the number of times that a result has been used. Content of the result usage info field 825 may be used to determine a rating of a search result, whether a stored search result should be provided to a user, compensation for a guide, a user, the search system 130 and/or a provider of a resource associated with a result, etc. Using the example in FIG. 8, the usage information '1005' is associated with the result 'there are 50 mountain gorillas in zimbabwe', which may indicate that there are 50 mountain gorillas in zimbabwe' has been provided 1005 times.

As illustrated in FIG. 9, a sample of an exemplary keyword/category record 900 is provided, of which one or more may be associated with or resident in the search database 120 (FIG. 1). The keyword/category record 900 may include a keyword/category record ID field 905, a keyword/category guide ID field 910, a keyword/category guide rating field 915, a keyword/category resource ID field 920 and a keyword/category resource rating field 925.

The keyword/category record ID field 905 contains an identifier of a keyword/category, which is preferably unique and preferably used consistently. For example, in at least one embodiment, the keyword/category record ID field 905 can include a randomly generated numerical code, and/or a string indicating a keyword/category. A keyword/category record ID serves to distinguish a keyword/category record associated with a keyword/category from a keyword/category record associated with other keyword/category(s). Although particular examples of identifiers are described herein, other types of identifiers uniquely indicating a keyword/category(s) may be utilized without departing from the spirit and scope of the embodiments herein. Using the example in FIG. 9, 'mountain gorillas_science>biology>primates' is the keyword/category record ID associated with the keyword/category record 900.

The keyword/category guide ID field 910 may include an identifier of a guide(s) that has registered to respond to a request(s) associated with a keyword(s) and/or category(ies). Content of the keyword/category guide ID field 910 may be used to establish communication with a guide(s) based on the content of a guide record such as the guide record 500 (FIG. 5). Using the example in FIG. 9, '502.330.1454' and 'mark marx' are the guide identifiers associated with the keyword/category record 900. This may indicate that the guide '502.330.1454' and the guide 'mark marx' have registered to respond to request(s) associated with the with the keyword/category ID 'mountain gorillas_science>biology>primates'. The association of a guide(s) with a keyword/category may be used to determine whether a guide(s) may access a restricted resource based on information indicated in a restricted resource record such as the restricted resource record 600 (FIG. 6). In this instance, the guides '502.330.1454' and the guide 'mark marx' may be permitted to access the restricted resource 'national geographic' using the username 'mountain' and the password 'getbetteranswers3' and the associated access rights. This is one example of how a guide(s) may be provided with access to a restricted resource, database, but may not be aware of the specific information required to access the restricted resource.

The keyword/category guide ratings field 915 may include information of ratings associated with a guide(s). Any type of rating information such as a number, and/or text, etc. may be used to indicate a rating(s) of a guide associated with a keyword/category. In at least one embodiment, the keyword/category guide ID field 910 is linked to the keyword/category guide ratings field 915 by for example a pointer. Rating information associated with a guide(s) and a keyword/category may be used to select a guide(s) to respond to a request associated with the keyword/category. Using the example illustrated, the guide '502.330.1454' has a rating of '9.0' and the guide 'mark marx' has a rating of '7.5' associated with the keyword/category 'mountain gorillas_science>biology>primates'. This may indicate that the guide '502.330.1454' may be more likely to be selected to respond to a request associated with the keyword/category 'mountain gorillas_science>biology>primates'.

The keyword/category resource ID field 920 may include an identifier of a resource(s) that has been associated with a keyword(s) and/or category(ies). The content of the keyword/category resource ID field 920 may be used to establish communication with a resource(s) based on the content of a resource record such as the restricted resource record 600 (FIG. 6). Using the example in FIG. 9, the resource 'national geographic' and the resource 'gorilla wiki' are associated with the keyword/category record 900, which may indicate that 'national geographic' and 'gorilla wiki' have been associated with the with the keyword/category 'mountain gorillas_science>biology>primates'.

The keyword/category resource ratings field 925 may include information of ratings associated with a resource(s). Any type of rating information such as a number, and/or text, etc. may be used to indicate a rating(s) of a resource associated with a keyword/category. In at least one embodiment, the keyword/category resource ID field 920 is linked to the keyword/category resource ratings field 925 by for example a pointer. Rating information associated with a resource(s) and a keyword/category may be used to select a resource(s) to be provided responsive to a search request associated with a keyword/category. Using the example illustrated in FIG. 9, 'national geographic' has a rating of '9.5' and 'gorilla wiki' has a rating of '5.5' associated with the keyword/category 'mountain gorillas_science>biology>primates'. This may indicate that the resource 'national geographic' may be more likely to be provided responsive to a search request associated with the keyword/category 'mountain gorillas_science>biology>primates'.

In at least one embodiment, information indicated in the search database 120 (FIG. 1) may be provided to a resource such as a search engine. For example, information of a search request(s), a search result(s), and a resource(s) used to obtain the search result(s) may be provided as a web page(s) by a server(s) associated with the search system 130. A web crawler functionality of a search engine may access the web page(s) provided by the search system 130. Content of a web page(s) may increase a ranking of a page including a URL of a restricted resource(s) which provided a relevant search result(s). For example, a user search request to an automated search may be a specific query such as 'Are there mountain gorillas in Zimbabwe?' and an automated search system may favor an exact match to the keywords or even the entire query. Keywords of the query and a precise or close proximity phrase match may not appear in the abstract and/or summary information of an article which may be exposed by the restricted resource. Because the search result(s), the search request(s), the search resource(s), and other information of the search are exposed, the probability of the restricted resource being indicated to a user of an automated search may increase.

Figure 10:
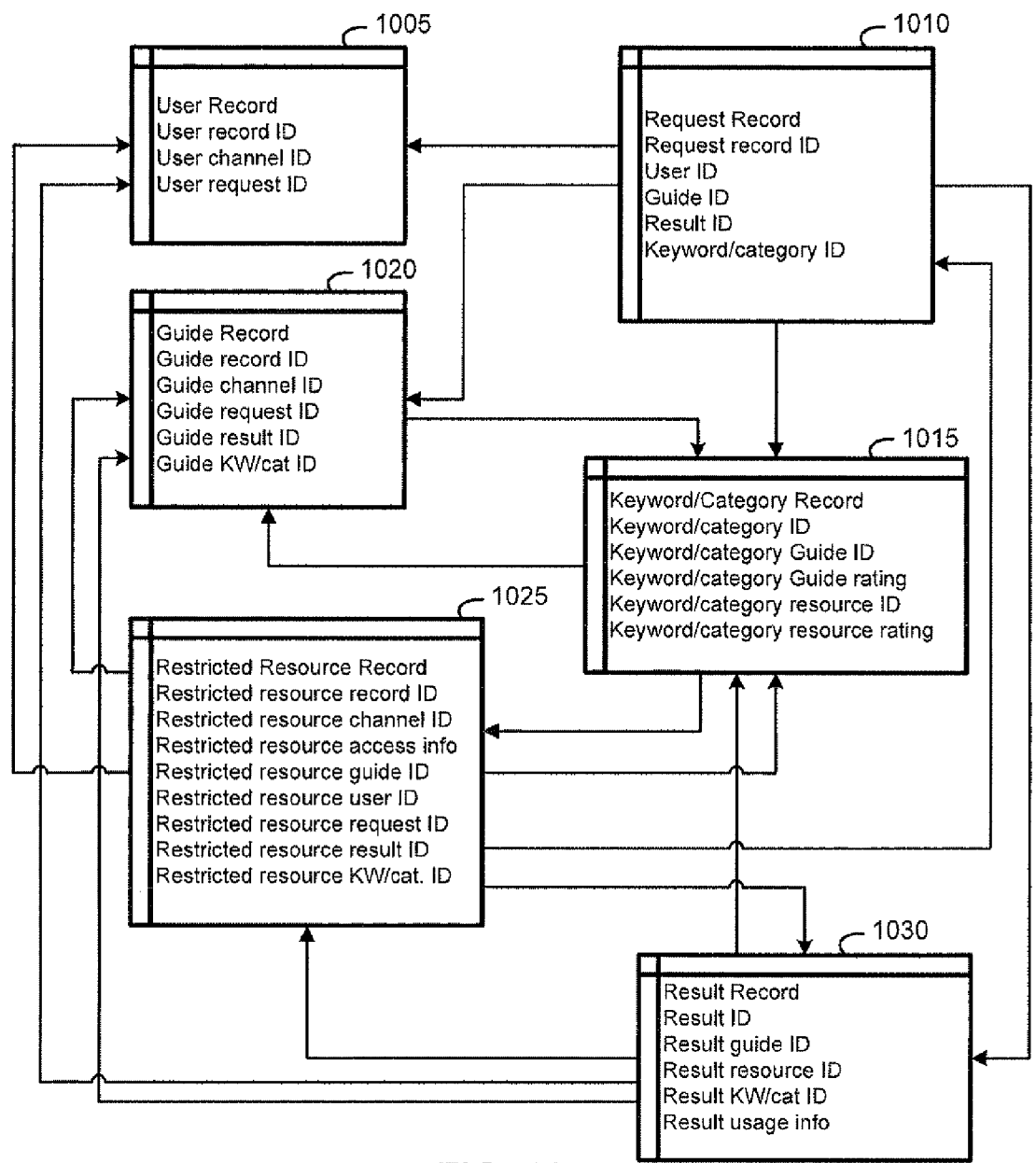
FIG. 10 illustrates a database relationship.

A simplified database relationship between records in the database 120 (FIG. 1) is depicted in FIG. 10. A user associated with the user record 1005 may submit a request to the search system 130 (FIG. 1), which may cause a request record 1010 to be created and/or modified. A user ID relating to the user is recorded in the request record 1010. Information relating to a user request such as content of the request, information associated with a user device(s), etc. may be indicated in the request record 1010 A number of keywords and/or may be associated with the user request automatically and/or using the assistance of a guide. A pointer indicating one or more keyword/category records 1015 may be added to the request record 1010. Guides associated with the selected keyword/category records 1015 are selected based on the ratings associated with the guides and the selected keyword/category records 1015. The highest ranked guide is notified of a request using information indicated in the guide record 1020 associated with the guide ID selected. If a guide elects to respond to the request, information indicated in the request record 1010 may be provided to the guide.

The selected guide may be presented with resources which may be used to respond to the request based on a ranking of resources using the resource rating information associated with the keyword/category record 1015. Access information for a restricted resource may be provided to a guide using information indicated in the restricted resource record 1025. Access to the restricted resource may be modified based on permissions indicated in the restricted resource record 1025. If a result is obtained, a result record 1030 is created and information of the result is recorded in the guide record 1020, the restricted resource record 1025, and the request record 1010. Information of a search result(s) may be provided to a user based on information indicated in the user record 1005.

A simplified database relationship is illustrated in FIG. 11. The request record table 770 may be composed of multiple request records, such as the request records 700*a*, 700*b*, 700*c* and 700*d*. The restricted resource record table 660 may be composed of multiple restricted resource records, such as the restricted resource records 600*a*, 600*b*, 600*c* and 600*d*.

Using the example in FIG. 11, the request record 700*a* may indicate that the request 'Request 1' as indicated in the request record ID field 705 associated with the user 'User 1' as indicated in the user ID field 710, assigned to the guides 'Guide 1' and 'Guide 2' as indicated in the guide ID field 715 is associated with the results 'Result111', 'Result112' and 'Result121' as indicated in the result ID field 720. The restricted resource record 600*a* may indicate that 'Guide 1' and 'Guide 2' indicated in the restricted resource guide ID field 620 are allowed to access 'PDB 1'. 'User 1' is allowed to receive a result(s) produced using the database 'PDB 1' as indicated in the restricted resource user ID field 625 of the restricted resource record 600*a*. An access(es) to the restricted resource 'PDB 1' is associated with the requests 'Request 1' and 'Request 2' as indicated in the restricted resource request ID field 630 of record 600*a*. 'Result112' and 'Result212' were produced using the restricted resource 'PDB 1' as indicated in the restricted resource result ID field 635 of the restricted resource record 600*a*. 'Result111' produced using the 'PDB 4', as indicated in the restricted resource result ID field 635 of the restricted resource record 600*d*, and/or 'Result112' and/or 'Result121' may be presented to 'User 1'.

The request record 700*b* may indicate that 'Request 2' as indicated in the request record ID field 705 associated with 'User 1' and 'User 2' as indicated in the user ID field 710, associated with 'Guide 1' and 'Guide 3' as indicated in the guide ID field 715 is associated with 'Result211', 'Result212' and 'Result231' as indicated in the result ID field 720. The restricted resource ID record 600*b* indicates that 'Guide 2' and 'Guide 3' indicated in the restricted resource guide ID field 620 are allowed to access 'PDB 2' as indicated in the restricted resource ID field 605. The user 'Any' (i.e., any user) is allowed to receive a result(s) produced using 'PDB 2' as indicated in the restricted resource user ID field 625 of the restricted resource record 600*b*. An access(es) to 'PDB 2' is associated with the requests 'Request 2' and 'Request 4' as indicated in the restricted resource request ID field 630 of the restricted resource record 600*b*. 'Result231', 'Result421', 'Result423' and 'Result431' were produced using 'PDB 2' as indicated in the restricted resource result ID field 635 of the restricted resource ID record 600*b*. 'Result211' produced using 'PDB 4', as indicated in the restricted resource record 600*d*, and/or 'Result212' and/or 'Result231' produced using 'PDB 2' may be presented to 'User 1' and/or 'User 2'. However, 'Result 212' may be presented to 'User 1' but not to 'User 2' as it was produced using 'PDB 1' which does not include 'User 2' in the restricted resource user ID field 625 of the restricted resource ID record 600*a*.

The request record 700*c* may indicate that 'Request 3' as indicated in the request record ID field 705 associated with 'User 1' and 'User 3' as indicated in the user ID field 710, associated with 'Guide 1' and 'Guide 2' as indicated in the guide ID field 715 is associated with 'Result311', 'Result312', 'Result321', and 'Result322' as indicated in the result ID field 720. The restricted resource ID record 600*c* indicates that guides 'Any' (i.e., any guide) indicated in the restricted resource guide ID field 620 are allowed to access 'PDB 3' as indicated in the restricted resource ID field 605. 'User 3' may be allowed to receive a result(s) produced using 'PDB 3' as indicated in the restricted resource user ID field 625 of the restricted resource record 600*c*. An access(es) 'PDB 3' is associated with 'Request 3' and 'Request 4' as indicated in the restricted resource request ID field 630 of the restricted resource record 600*c*. As indicated in the restricted resource record 600*c*, a search result(s) may not be produced responsive to a request, such as 'Request 4' even though a request is associated with accessing a restricted resource such as 'PDB 3'. This may indicate that a guide(s) (e.g., 'Guide 1' and/or 'Guide 2') did not produce a search result(s) responsive to a request (e.g., 'Request 4') when a restricted resource (e.g., 'PDB 3') was accessed. The results 'Result311' and 'Result321' were produced using the restricted resource 'PDB 3' as indicated in the restricted resource result ID field 635 of the restricted resource record 600*c*. The results 'Result311' and/or 'Result321' produced using 'PDB 3', as indicated in the restricted resource record 600*c*, and/or 'Result312' and/or 'Result 322' may be presented to 'User 3'. However, 'Result311' and/or 'Result322' may not be presented to 'User 1' as 'User 1' associated with 'Request 3' is not authorized to receive a result(s) produced using 'PDB 3' as indicated in the restricted resource user ID field 625 of the restricted resource record 600*c*.

The request record 700*d* may indicate that the request 'Request 4' as indicated in the request record ID field 705 associated with 'User 3' as indicated in the user ID field 710, associated with 'Guide 2' and 'Guide 3' as indicated in the guide ID field 715 is associated with 'Result421', 'Result422', 'Result423', and 'Result431' as indicated in the result ID field 720. The restricted resource record 600*d* may indicate that guides 'Any' (i.e., any guide) indicated in the restricted resource guide ID field 620 is allowed to access 'PDB 4' as indicated in the restricted resource ID field 605. The user 'Any' (i.e., any user) is allowed to receive a result(s) produced using 'PDB 4' as indicated in the restricted resource user ID field 625 of the restricted resource record 600*d*. An access to 'PDB 4' is associated with 'Request 1', 'Request 2' and 'Request 4' as indicated in the restricted resource request ID field 630 of the restricted resource record 600*d*. As indicated in the restricted resource record 600*d*, 'Result111', 'Result211', and 'Result431' were produced using 'PDB 4' as indicated in the restricted resource result ID field 635 of the restricted resource record 600*d*. 'Result421' and/or 'Result423' produced using 'PDB 2', as indicated in the restricted resource record 600*b*, and/or 'Result421', which may have been produced using a public resource, and/or 'Result 431' produced using 'PDB 4' as indicated in the restricted resource record 600*d* may be presented to 'User 3'.

The information indicated in the restricted resource record table 660 may also be used to determine compensation for a provider of a restricted resource, such as the operator of the restricted resource system 150 (FIG. 1). For example, a number of results produced using a restricted resource, as indicated in the restricted resource result ID field 635 (FIG. 11) might be used to determine compensation of a provider of a restricted resource, and/or a number of results provided to a user(s) which were produced using the restricted resource may be used to determine compensation for a guide(s) and/or the provider of the search system 130 (FIG. 1).

While the relationships in the database have been depicted using a limited number of user, guide, restricted resource, request, result and keyword/category records, any number of records required to operate the embodiments may be utilized by the search system 130.

Using the embodiments described herein, a user may submit a search request to a search system utilizing the assistance of human guides and receive a search result(s) based on information indicated in a restricted resource. A guide registered with a search system may be granted access to a restricted resource(s) based on access information provided to the search system. A guide may obtain a search result utilizing information indicated in a restricted resource. A search result obtained using information indicated in a restricted resource may be provided to a user.

Access to a restricted resource may be restricted to a group of registered guides. A different restricted resource access right(s) may be granted to different groups of guides. Access to a search result(s) obtained using information indicated in a restricted resource may be restricted to a group of users. A different search result access privilege(s) may be granted to different groups of users. Compensation for a guide(s), a provider(s) of a restricted resource, and/or the search system may be based on information associated with a restricted resource. A ranking of a restricted resource may be based on information associated with a restricted resource. Information obtained by guides regarding a restricted resource may be provided in order to improve the ability of automated systems to rank the restricted resource.

The present invention may be implemented using a program stored, for example, in a computer-readable storage medium such as a CD-ROM, etc., or using one or more specialized terminals, devices or systems that is enabled to execute operation(s) described herein.

The many features and advantages of the invention are apparent from the detailed specification and, thus, it is intended by the appended claims to cover all such features and advantages of the invention that fall within the true spirit and scope of the invention. Further, since numerous modifications and changes will be readily perceived by those of ordinary skill in the art, it is not desired to limit the invention to the exact construction and operation illustrated and described, and accordingly all suitable modifications and equivalents may be resorted to while falling within the scope of the invention.

What is claimed is:

1. A method of conducting a search, comprising:
   receiving, by a processor, a request for information from a user;
   determining whether a restricted resource is relevant to the request;
   selecting, by the processor, a human searcher based on an access right of the restricted resource;
   associating the restricted resource with a keyword or a category;
   ranking the restricted resource for the keyword or the category based on a rating of relevance of the keyword or the category to the request;
   allowing the human searcher an access to the restricted resource when determining that the user is not authorized for the access to the restricted resource;
   obtaining the information using the restricted resource; and
   providing the information to the user.

2. The method of claim 1, further comprising:
   providing a response including an indication of the restricted resource in addition to the information.

3. The method of claim 2, wherein the indication is an advertisement.

4. The method of claim 1, wherein the relevance is based on a ranking of the restricted resource relative to a plurality of resources associated with the request, the ranking being independent of whether the user is authorized for the access.

5. The method of claim 1, wherein the access conceals from the human searcher information required to obtain a subsequent access to the restricted resource.

6. The method of claim 1, wherein the information includes a specific answer to the request and the specific answer is composed by the human searcher.

7. The method of claim 1, wherein the allowing is based on historical information of a number of accesses of the restricted resource or a number of accesses of the restricted resource by the user.

8. The method of claim 1, wherein the access to the restricted resource is provided when determining that the human searcher is not authorized to access the restricted resource and that the access is authorized to the user.

9. The method of claim 1, wherein a portion of information indicated in the restricted resource is provided responsive to the request.

10. The method of claim 9, wherein the information is text and the portion is a selection made by the human searcher which is limited by a provider of the restricted resource.

11. The method of claim 1, wherein the access to the restricted resource is allowed based on an affiliation of the human searcher.

12. The method of claim 1, wherein the access to the restricted resource is allowed based on a keyword of the request.

13. The method of claim 1, further comprising:
   providing information of the request, the information, and the restricted resource in a location accessible for indexing by one or more automated search engines.

14. The method of claim 1, wherein the human searcher is selected based on historical information of receipt of content of the restricted resource by the human searcher.

15. A persistent computer readable medium storing therein a program for causing a computer to execute an operation including providing access to a restricted resource, comprising:
   determining whether an access to a restricted resource is authorized in association with processing a request for information received from a user;
   selecting the restricted resource based on relevance of the restricted resource to the request;
   associating the restricted resource with a keyword or a category;
   ranking the restricted resource for the keyword or the category based on a rating of relevance of the keyword or the category to the request;
   selecting a human searcher associated with an access right allowing the human searcher the access to the restricted resource when determining that the access is not authorized to the user;
   selecting a human searcher associated with a subject matter of the request when determining that the access is authorized for the user;
   receiving the information from the human searcher based on the access; and
   providing the information to the user.

16. The computer readable medium of claim 15, wherein the determining includes determining relevance of the restricted resource to the request based on an action of the human searcher.

17. The computer readable medium of claim 15, wherein the access to the restricted resource is provided based on the access right to the restricted resource determined by one of a search system managing the request and the human searcher.

18. The computer readable medium of claim 15, wherein the access to the restricted resource prevents providing information permitting a discretionary access to the restricted resource to the human searcher.

19. A system, comprising:
- a user device for submitting a request for information;
- a search system providing the request to a guide system operated by a human searcher, choosing the guide system based on an access right of the guide system for a restricted resource, associating the restricted resource with a keyword or a category, ranking the restricted resource for the keyword or the category based on a rating of relevance of the keyword or the category to the request, selecting the restricted resource based on relevance of the restricted resource to the request, and returning the information to the user device based on content of the restricted resource, the content being obtained by the guide system;
- the guide system accessing the restricted resource to process the request when determining that the user device is denied an access to the restricted resource;
- a database including access and ranking information; and
- the restricted resource providing the information.

\* \* \* \* \*